(12) United States Patent
Bloom et al.

(10) Patent No.: US 7,951,862 B2
(45) Date of Patent: May 31, 2011

(54) HYDROGENATED AND PARTIALLY HYDROGENATED HEAT-BODIED OILS AND USES THEREOF

(75) Inventors: Paul D. Bloom, Decatur, IL (US); David P. Holzgraefe, Quincy, IL (US)

(73) Assignee: Archer Daniels Midland Company, Decatur, IL (US)

( * ) Notice: Subject to any disclaimer, the term of this patent is extended or adjusted under 35 U.S.C. 154(b) by 0 days.

(21) Appl. No.: 12/876,308

(22) Filed: Sep. 7, 2010

(65) Prior Publication Data

US 2011/0003727 A1     Jan. 6, 2011

Related U.S. Application Data

(63) Continuation of application No. 11/708,998, filed on Feb. 21, 2007, now Pat. No. 7,842,746, which is a continuation-in-part of application No. 10/428,146, filed on May 2, 2003, now Pat. No. 7,420,008.

(60) Provisional application No. 60/376,807, filed on May 2, 2002, provisional application No. 60/403,505, filed on Aug. 15, 2002, provisional application No. 60/434,419, filed on Dec. 19, 2002.

(51) Int. Cl.
*C09D 11/02* (2006.01)
*C08L 91/06* (2006.01)
*C08L 91/00* (2006.01)

(52) U.S. Cl. .................. 524/270; 524/313; 524/277
(58) Field of Classification Search .................. 524/270, 524/313, 277
See application file for complete search history.

(56) References Cited

U.S. PATENT DOCUMENTS

| | | | | |
|---|---|---|---|---|
| 3,210,328 A * | 10/1965 | Kiefer, Jr. | .................. | 525/332.9 |
| 4,460,570 A * | 7/1984 | Strasilla et al. | ............ | 424/70.16 |
| 4,990,272 A * | 2/1991 | Morita et al. | .................. | 508/144 |
| 5,713,990 A * | 2/1998 | Erhan et al. | ................. | 106/31.35 |
| 7,420,008 B2 * | 9/2008 | Bloom | ........................... | 524/270 |
| 7,842,746 B2 * | 11/2010 | Bloom et al. | .................. | 524/270 |

OTHER PUBLICATIONS

Fred L. Fox "Oils for Organic Coatings" edited by Wayne R. Fuller (p. 24, line 17 to p. 25, line 25), Sep. 1965.*

* cited by examiner

*Primary Examiner* — William K Cheung
(74) *Attorney, Agent, or Firm* — Scott Bloomer; William B. Miller

(57) ABSTRACT

The present disclosure presents materials comprising hydrogenated and/or partially hydrogenated polymerized vegetable oils. Non-limiting applications of the polymerized oils, including coatings, binders, blends, and greases are presented. Methods for forming these materials are also disclosed.

23 Claims, 1 Drawing Sheet

HYDROGENATED AND PARTIALLY HYDROGENATED HEAT-BODIED OILS AND USES THEREOF

CROSS-REFERENCE TO RELATED APPLICATIONS

This application is a Continuation of U.S. Non-Provisional application Ser. No. 11/708,998, filed Feb. 21, 2007, U.S. Pat. No. 7,842,746, which is a Continuation-in-Part of U.S. Non-Provisional application Ser. No. 10/428,146, filed May 2, 2003, U.S. Pat. No. 7,420,008, which claims benefit under 35 U.S.C. §119(e) to U.S. Provisional Applications: 60/376,807, filed May 2, 2002, 60/403,505, filed Aug. 15, 2002, and 60/434,419, filed Dec. 19, 2002, all of which are hereby incorporated herein by reference in their entirety.

BACKGROUND

1. Technical Field

Polymerized biologically-derived oils ("heat-bodied oils"), blown biologically-derived oils ("heavy bodied blown oils"), vegetable-based copolymer oils, and vegetable oil/vegetable-based copolymer oil blends for various uses, such as, to make a semi-crystalline wax-like material are disclosed.

2. Background Art

Petrolatums and micro-crystalline waxes are components in a large number of products ranging from personal consumer goods to industrial lubricants. Petrolatums and micro-crystalline waxes are derived from petroleum. Thus, the supply of such ubiquitous raw materials is non-renewable. Petrolatums are semisolid mixtures of hydrocarbons, and are neutral, unctuous, odorless, and tasteless. They have applications in the formulation of products such as creams, lotions, hair preparations, cosmetics, candles, ointments, lubricants and coatings. Typical petrolatums have cone penetration of above 100 dmm and less than 275 dmm (ASTM D937). The melting range of petrolatums is about 38° C. to about 60° C. Micro-crystalline wax is a solid mixture of linear, branched and cyclic hydrocarbons derived from petroleum. It is obtained from the heavy lubricating oil fraction derived from crude oil, subsequent to the removal of paraffin wax. Its characteristics closely resemble those of the natural waxes, including its high melting point, high viscosity, flexibility at low temperatures, and high cohesion and adhesion. Micro-crystalline waxes are usually higher in molecular weight, viscosity and melting point than paraffin wax. Typically, micro-crystalline wax melting points range from 54° C. to about 102° C. They have needle penetration of above 3 dmm and less than 100 dmm (ASTM D1321). Viscosities are higher than 5.75 centistokes at 100° C.

Heat polymerized oils ("polymerized oils"), often referred to as heat bodied oils, are prepared from unsaturated oils. Linseed, safflower and soybean oils are commonly used as the starting materials for this process. In addition, fish oils are commonly heat polymerized. Depending on the oil used, the temperature is held between about 288° C. to about 316° C. until a product with a desired viscosity is obtained. Longer reaction times are used to reach a higher viscosity product. The viscosity of polymerized oils is described using a scale with values ranging from P to $Z_9$. During the heat-polymerization reaction, the unsaturated triacylglycerols react to form polymers. As polymerization takes place, new carbon-carbon bonds are formed between triacylglycerol units at sites occupied by double bonds in the original triacylglycerols. Ester bonds between glycerol and fatty acids in the original triacylglycerols remain intact.

Polymerized oils have some improved properties for paint, coatings and ink applications in comparison to unsaturated triacylglycerols. These properties include improved leveling, pigment wetting, and less yellowing. Typical polymerized oils still contain a high amount of unsaturation. The iodine value ("IV") of heat bodied linseed oils ranges from approximately 115-150. Polymerized oils are reactive, viscous liquids at room temperature.

Blown oils differ from polymerized oils. Blown linseed oil is prepared by bubbling air through the oil while heating to temperatures of about 110° C. During the process, the oil is polymerized and partially oxidized.

Vegetable-based copolymer oils such as maleinized and dicyclopentadiene oils are characterized by a fast drying time and water resistance. Blending such copolymer oils with vegetable oils yields oil blends that also possess characteristic properties and provides more diversity of chemical properties. Other attributed properties can include the unique hardness of a dried coating when such copolymer oils are incorporated into paint or coating formulations.

SUMMARY

Various embodiments of the present disclosure provide materials comprising hydrogenated and/or partially hydrogenated polymerized vegetable oils.

In one embodiment, the present disclosure provides a material comprising at least one of a heat bodied oil and a hydrogenated polymerized oil, wherein the material is one of a binder and a coating. In certain embodiments, the material may be a binder selected from the group consisting of a hot melt adhesive, a binder for a wood composite material, a binder for a feed block, a binder for an agricultural product, an asphalt binder, and a binder for a personal care product. In other embodiments, the material may be a coating selected from the group consisting of a coating for an agricultural product, a packaging coating, an edible food coating, and a concrete mold release coating.

According to other embodiments, the present disclosure provides a candle wax comprising a hydrogenated polymerized oil and, optionally, at least one additive. The additive may be selected from the group consisting of a vegetable oil, an alkyl ester, a perfume, a scent, and a petroleum derivative. Candles formed from the candle wax are also disclosed.

Still other embodiments of the present disclosure provide a polymer composition comprising a heat bodied oil or a partially hydrogenated polymerized oil, wherein at least on remaining carbon-carbon double bond has been converted to at least one epoxide.

Further embodiments of the present disclosure provide a material comprising at least one of a heat bodied oil and a hydrogenated polymerized oil and at least one organic material. The organic material may be selected from the group consisting of a vegetable based material and a petrochemical derived material.

Still further embodiments of the present disclosure provide a grease comprising a hydrogenated polymerized oil and at least one metal salt of a free fatty acid.

Other embodiments of the present disclosure provide an emulsion comprising at least one of a heat bodied oil and a hydrogenated polymerized oil; and at least one emulsifier. The emulsifier may be selected from the group consisting of xanthan gum, propylene glycol alginate, locust bean gum, maltodextrin, a fatty alcohol ethoxylate, a fatty acid ethoxylate, a sorbitan derivative, a polyglycerol ester, lecithin, and combinations of any thereof

BRIEF DESCRIPTION OF THE DRAWINGS

The various embodiments of the present disclosure will be better understood when read with reference to the following figures.

DETAILED DESCRIPTION

Figure 1:
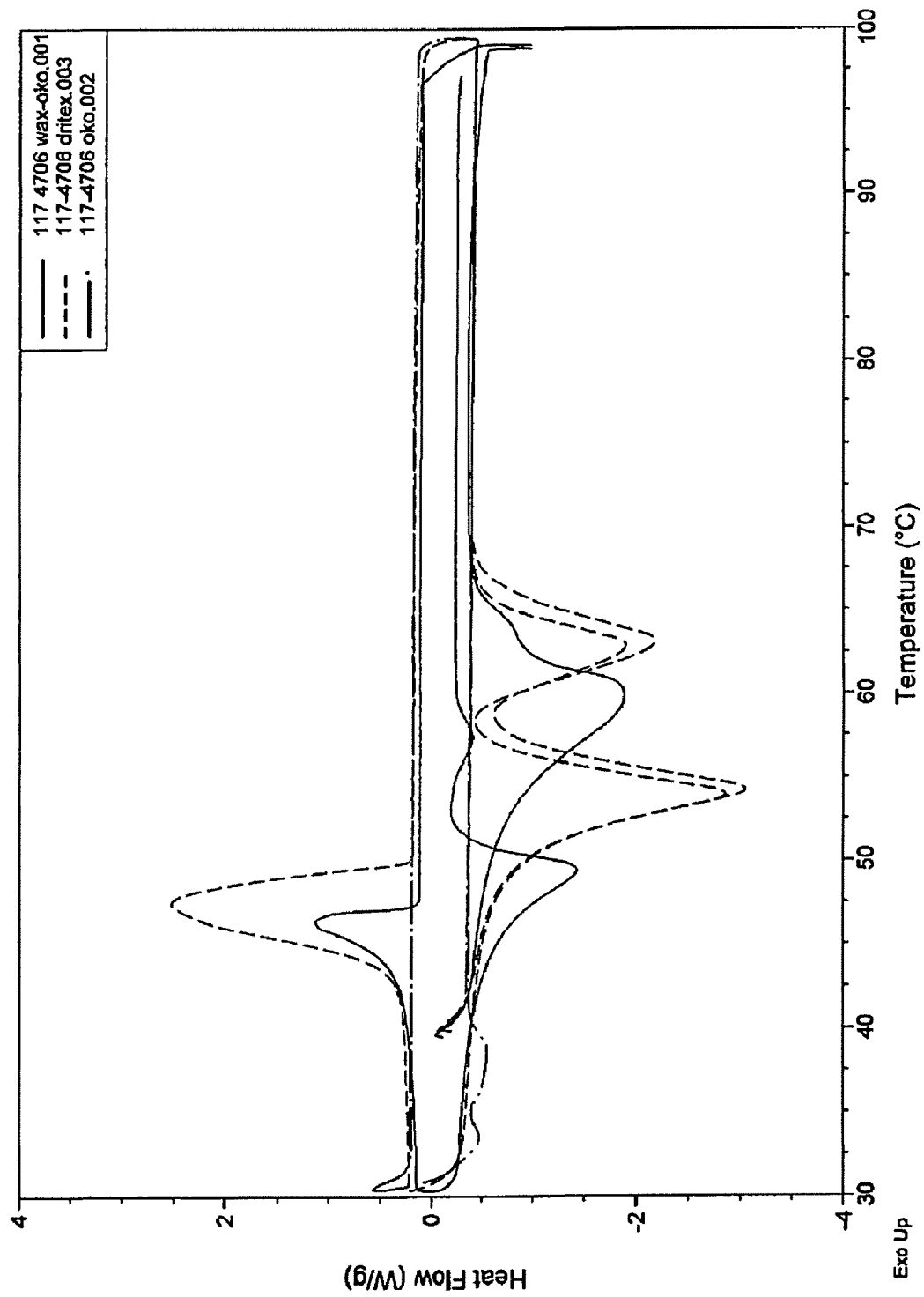
FIG. 1 illustrates a differential scanning calorimetry scan of a product from interesterification of one embodiment of the present disclosure.

In a first aspect, the present disclosure is directed to a composition comprising a hydrogenated polymerized oil. In this aspect, the hydrogenated polymerized oil is derived from an oil selected from the group consisting of fish, animal, vegetable, synthetic and genetically-modified plant oils, and derivatives and mixtures thereof. In one embodiment, the oil is a vegetable oil. In another embodiment, the vegetable oil is selected from the group consisting of high erucic acid rapeseed, soybean, safflower, canola, castor, sunflower and linseed oils. In an embodiment of the first aspect, the hydrogenated polymerized oil has an iodine value below about 110. In another embodiment, the iodine value is below about 70 and in another embodiment it is below about 30. Compositions comprising a hydrogenated polymerized oil include vegetable-based jellies and waxes. Other compositions include, but are not limited to, creams, lotions, hair preparations, cosmetics, candles, ointments, lubricants and coatings. One embodiment of this aspect of the present disclosure is a composition comprising a hydrogenated polymerized oil, wherein the hydrogenated polymerized oil replaces or supplements a petrolatum or micro-crystalline wax material ingredient in the composition. For example, according to various embodiments, the hydrogenated polymerized oil may replace from 1% to 100% by weight of a petrolatum or micro-crystalline wax material. In this embodiment, any product containing a petrolatum or micro-crystalline wax can be reformulated to comprise a hydrogenated polymerized oil, such a hydrogenated polymerized oil reduces the amount or eliminates entirely the requirement of a petrolatum or micro-crystalline wax component in the composition. When such a composition is reformulated in this manner, the composition retains those characteristics attributed to a petrolatum or micro-crystalline wax material, but the composition contains a reduced amount or none of these materials.

A composition of the present disclosure can be a semi-solid or wax-like material. The state of the composition will depend on the degree of hydrogenation, which is measured by the IV. The hardness or softness of the material may be a result of the level of hydrogenation. Thus, when a material having a different consistency is desired, the oil(s) comprising the composition may be hydrogenated fully or partially to yield the desired consistency. Depending on the material's hardness or softness preferred, the oil(s) comprising the composition may be hydrogenated to the extent desired. Although the physical characteristics of the composition can be determined empirically, the IV values of the oil(s) can be used to measure the degree of hydrogenation for any given embodiment of the present disclosure. The term "hydrogenated" thus encompasses varying degrees of partial and full hydrogenation. The IV values of the hydrogenated oil(s) claimed herein will fall below about 110, in another embodiment below about 70, and in still another embodiment below about 30. Iodine values with these ranges are characteristic of the desired physical nature of the oil(s) comprising the present disclosure. The present disclosure describes a vegetable-based composition that possesses characteristics such as Congeal Point (ASTM D938), Drop Melt Viscosity (ASTM D127), Kinematic Viscosity (ASTM D445), Needle Penetration (ASTM D1321), similar to the properties of a petrolatum or micro-crystalline wax.

In another embodiment, the present disclosure is directed to a vegetable based jelly or wax comprising a hydrogenated polymerized vegetable oil, wherein said oil has an iodine value below about 110. In another embodiment, the iodine value is below about 70. In still another embodiment the iodine value is below about 30. A vegetable based jelly as described herein would be comparable to a petroleum based jelly such as Vaseline® petroleum jelly. In this embodiment the composition can be a semi-solid or wax-like material at a temperature between about 0° C. to about 100° C. possessing characteristics such as Congeal Point (ASTM D938), Drop Melt Viscosity (ASTM D127), Kinematic Viscosity (ASTM D445), Needle Penetration (ASTM D1321), similar to the properties of a petrolatum or micro-crystalline wax.

In another embodiment, the composition comprising a hydrogenated polymerized oil further comprises a fatty acid ester of triglycerol (triglycerol: CA number 56090-54-1). The fatty acid ester of triglycerol can be a mono-, di-, tri-, tetra-, or penta-ester. In still other embodiments, the fatty acid ester is behenic acid ester. Such esters can be added to modify the micro-crystallinity of wax-like solids or otherwise enhance the desired physical characteristics describe above.

In another embodiment, the composition comprising a hydrogenated polymerized oil further comprises a fatty acid ester of triglycerol and a refined, bleached and deodorized (RBD) vegetable oil. In such a composition, it may be desirable that the hydrogenated polymerized oil, the RBD vegetable oil and the fatty acid ester are respectively present in a range of ratios wherein the final product has the desired properties. Such properties may be affected by the relative ratios of the above ingredients and can vary depending on the composition's end-use, which are described herein. In certain embodiments, the RBD oil is selected from the group of vegetable oils consisting of high erucic acid rapeseed, soybean, safflower, canola, castor, sunflower and linseed oils. In another embodiment, the hydrogenated polymerized oil is derived from soy oil, the RBD oil is soy oil, and the fatty acid ester is behenic acid ester. One embodiment of such a composition comprises a hydrogenated polymerized soy oil, the triacylglycerol is soy oil and the fatty acid ester is a behenic acid ester. In any of these embodiments, the ratios of hydrogenated polymerized oil to RBD vegetable oil to fatty acid ester can be modified to yield the desired product consistency in accord with the final disposition of the product. The respective amount of any of the above primary ingredients can be adjusted from between about 1% to about 98% of the composition. As exemplified herein (Example 15), one embodiment comprises hydrogenated polymerized soy oil, RBD soy oil and behenic acid ester respectively present in a ratio of about 49:50:1.

In another embodiment, the composition comprising a hydrogenated polymerized oil further comprises one or more hydrogenated vegetable oils. The one or more hydrogenated vegetable oils are derived from a group of vegetable oils consisting of high erucic acid rapeseed, soybean, safflower, canola, castor, sunflower and linseed oils. In one embodiment, the hydrogenated vegetable oil is derived from high erucic acid rapeseed, soy or castor oil and the hydrogenated polymerized oil is derived from linseed oil.

In yet another embodiment, the one or more hydrogenated vegetable oils described above are blended to form a first oil mixture, which is then admixed with the hydrogenated polymerized oil. The first oil mixture can be admixed with the hydrogenated polymerized oil at a ratio of between about 1:1 to about 1:100 first oil mixture to hydrogenated polymerized oil. The ratio can be adjusted accordingly to suit the desired end-use of the composition or as needed for any reason. In certain embodiments, the first oil mixture is a blend of hydrogenated soy oil and hydrogenated high erucic acid rapeseed oil, wherein the ratio of hydrogenated soy oil to hydrogenated high erucic acid rapeseed oil is about 1:1. This ratio forms a blend that is useful as a crystal modifier, but the ratio can be adjusted accordingly to suit the desired end-use of the composition or as needed for any reason. Such a first oil mixture can be added to any hydrogenated polymerized oil at a ratio described above.

In another embodiment, the composition comprising a hydrogenated polymerized oil and one or more hydrogenated vegetable oils further comprises a vegetable oil. Such a vegetable oil is selected from the group consisting of high erucic acid rapeseed, soybean, safflower, canola, castor, sunflower and linseed oils. In one embodiment, the vegetable oil is sunflower oil. In this embodiment, the hydrogenated polymerized oil, one or more hydrogenated vegetable oils and the vegetable oil are respectively present in a range of ratios wherein the final product has the desired properties. Such properties may be affected by the relative ratios of the above ingredients and can vary depending on the composition's end-use, which are described above. In an embodiment exemplified herein (Example 14), the composition comprises about 2 parts sunflower oil, 1 part hydrogenated polymerized linseed oil, and 1 part of one or more hydrogenated vegetable oils as a first oil mixture (described above), wherein, in this instance, the first oil mixture consists essentially of a 1:1 blend of hydrogenated soy oil and hydrogenated high erucic acid rapeseed oil. This product has a physical consistency comparable to that of petroleum jelly. In another embodiment exemplified herein (Example 16), the composition comprises about 2 parts sunflower oil, 1 part hydrogenated polymerized linseed oil, and 1 part partially hydrogenated soy oil. This product has a physical consistency comparable to that of petroleum jelly.

The composition comprising a hydrogenated polymerized oil and one or more hydrogenated vegetable oils can further comprise a fatty acid ester of triglycerol. The hydrogenated vegetable oil(s) can be blended with said fatty acid ester of triglycerol at a ratio of between about 1:1 to about 100:1 hydrogenated vegetable oil(s) to said fatty acid ester to form a first blend. The ratio of oil and ester in the first blend can be adjusted accordingly to suit the desired end-use of the composition or as needed for any reason. The first blend can be admixed with the hydrogenated polymerized oil at a ratio of between about 1:1 to about 100:1 hydrogenated polymerized oil to said first blend to form the composition. In this embodiment, the hydrogenated polymerized oil, one or more hydrogenated vegetable oils and the fatty acid ester are respectively present in a range of ratios wherein the final product has the desired properties. Such properties may be affected by the relative ratios of the above ingredients and can vary depending on the composition's end-use, which are described above. In one embodiment, the hydrogenated polymerized oil is derived from linseed or soy oil; the hydrogenated vegetable oil is derived from soy oil; and the fatty acid ester is a behenic acid ester. In an embodiment exemplified herein (Example 12), the blend of hydrogenated vegetable oil/fatty acid ester of triglycerol and hydrogenated polymerized oil to form a final ratio of about 40:10:50 hydrogenated soy oil, behenic acid ester and polymerized linseed oil.

In all aspects, the composition can further comprise a free radical scavenger or an anti-oxidant, such as, for example, vitamin E, butylated hydroxytoluene (BHT) or butylated hydroxyanisole (BHA). In certain embodiments, the free radical scavenger or anti-oxidant is vitamin E. In other embodiments, the free radical scavenger or anti-oxidant is BHT. In other embodiments, the free radical scavenger or anti-oxidant is BHA.

In another aspect, the composition can comprise one or more hydrogenated polymerized vegetable oils, a first oil mixture consisting essentially of hydrogenated soy and high erucic acid rapeseed oils, one or more vegetable oils and vitamin E. An embodiment exemplified herein (Example 17) comprises a first oil mixture of hydrogenated soy and high erucic acid rapeseed oils at a ratio of about 1:1.

In another embodiment, the present disclosure describes a composition consisting essentially of a hydrogenated polymerized oil. The hydrogenated polymerized oil as described herein has an iodine value below about 110. In certain embodiments, the iodine value is below about 70. In other embodiments, the iodine value is below about 30.

In another embodiment, the present disclosure is directed to a vegetable-based coating comprising a hydrogenated polymerized vegetable oil having an iodine value below about 110. In one embodiment, the iodine value is below about 70 and in another embodiment below about 30. The vegetable based coating described herein would be useful for packaging coatings and the like. Such coatings include, but are not limited to, polyurethane coatings.

In yet another aspect, the present disclosure is directed to a process of preparing a hydrogenated polymerized oil composition. The process comprises hydrogenating a polymerized oil. In certain embodiments, hydrogenation comprises reacting the oil under a vapor pressure of hydrogen in the presence of a catalyst. In another embodiment, hydrogenation further comprises:

a) purging a reaction vessel containing a polymerized oil and a catalyst with hydrogen prior to pressurizing with hydrogen, b) heating the pressurized vessel containing the oil and catalyst to a temperature of between about 150° C. to about 400° C., c) adjusting the vapor pressure in the vessel by feeding hydrogen gas into the heated vessel, and d) cooling and filtering the product produced in steps a through c.

In certain embodiments, the vapor pressure of hydrogen is between about 50 psig to about 1000 psig.

In certain embodiments, the catalyst is selected from the group consisting of a nickel-based catalyst, copper, copper-chromite, platinum and palladium.

In another aspect, the present disclosure describes a process wherein the product is a semi-solid or wax-like material at a temperature between about 0° C. to about 100° C. comprising a hydrogenated polymerized oil. Such a material contains a hydrogenated oil with an iodine value below about 110. In one embodiment, the iodine value is below about 70 and in another embodiment the iodine value is below about 30.

In another embodiment, the present disclosure is directed to a process wherein said polymerized oil is derived from an oil selected from the group consisting of fish, animal, vegetable, synthetic and genetically-modified plant oils, and derivatives and mixtures thereof. In certain embodiments, the oil is a vegetable oil. In various embodiments, the vegetable oil is selected from the group consisting of soybean, safflower, canola, castor, sunflower and linseed oils.

In another aspect, the present disclosure describes a composition comprising a hydrogenated blown oil. In this aspect of the present disclosure, the hydrogenated blown oil is derived from an oil selected from the group consisting of fish, animal, vegetable, synthetic and genetically-modified plant oils, and derivatives and mixtures thereof In certain embodiments, the oil is a vegetable oil. In various embodiments, the vegetable oil is selected from the group consisting of high erucic acid rapeseed, soybean, safflower, canola, castor, sunflower and linseed oils. In an embodiment of the first aspect, the hydrogenated blown oil has a hydroxyl value below about 150, and an iodine value below about 110. In another embodiment, the iodine value is below about 70, and in still another embodiment below about 30. Compositions comprising a hydrogenated blown oil include vegetable-based jellies and waxes. Other compositions include, but are not limited to, creams, lotions, hair preparations, cosmetics, candles, ointments, lubricants, binders and coatings, including but not limited to polyurethane coatings. A one embodiment of this aspect of the present disclosure is a composition comprising a hydrogenated blown oil, wherein the composition replaces or supplements a petrolatum or micro-crystalline wax material ingredient in the composition. In this embodiment, any product containing a petrolatum or micro-crystalline wax can be reformulated to comprise a hydrogenated blown oil, such a hydrogenated blown oil reduces the amount or eliminates entirely the requirement of a petrolatum or micro-crystalline wax component in the composition. When such a composition is reformulated in this manner, the composition retains those characteristics attributed to a petrolatum or micro-crystalline wax material, but the composition contains a reduced amount or none of these materials.

In another embodiment, the present disclosure is directed to a vegetable based jelly or wax comprising a hydrogenated blown vegetable oil, wherein said oil has an iodine value below about 110. In one embodiment, the iodine value is below about 70, and in another embodiment below about 30. A vegetable based jelly as described herein would be comparable to a petroleum based jelly such as Vaseline® petroleum jelly. In this embodiment the composition can be a semi-solid or wax-like material at a temperature between about 0° C. to about 100° C. possessing characteristics such as Congeal Point (ASTM D938), Drop Melt Viscosity (ASTM D127), Kinematic Viscosity (ASTM D445), Needle Penetration (ASTM D1321), similar to the properties of a petrolatum or micro-crystalline wax.

In another aspect, the present disclosure describes a composition consisting essentially of a hydrogenated blown oil.

In certain embodiments the hydrogenated blown oil is derived from an oil selected from the group consisting of fish, animal, vegetable, synthetic and genetically-modified plant oil, and derivatives and mixtures thereof. In other embodiments, the blown oil is derived from a vegetable oil. In certain embodiments, the vegetable oil is high erucic acid rapeseed, soybean, safflower, canola, castor, sunflower or linseed oil. According to various embodiments, such a hydrogenated blown oil has a hydroxyl value below about 150. In other embodiments, a hydrogenated blown oil composition has an iodine value below about 110. In still other embodiments, the iodine value is below about 70 and in other embodiments below about 30. In one embodiment, the composition consisting essentially of a hydrogenated blown oil is a semi-solid or wax-like material at a temperature between about 0° C. to about 100° C. In this embodiment, the disclosure describes a composition that possesses characteristics such as Congeal Point (ASTM D938), Drop Melt Viscosity (ASTM D127), Kinematic Viscosity (ASTM D445), Needle Penetration (ASTM D1321), similar to the properties of a petrolatum or micro-crystalline wax.

In another embodiment, the present disclosure is directed to a vegetable-based coating comprising a hydrogenated blown vegetable oil, wherein said oil has an iodine value below about 110. In certain embodiments, the iodine value is below about 70, and in other embodiments below about 30. The vegetable based coating described herein would be useful for packaging coatings and the like.

In another aspect, the present disclosure describes a process for preparing a hydrogenated blown oil composition. The process comprises hydrogenating a blown oil. In certain embodiments, hydrogenation comprises reacting the oil under a vapor pressure of hydrogen in the presence of a catalyst. In another embodiment, hydrogenation further comprises:

a) purging a reaction vessel containing a blown oil and a catalyst with hydrogen prior to pressurizing with hydrogen, b) heating the pressurized vessel containing the oil and catalyst to a temperature of between about 150° C. to about 400° C., c) adjusting the vapor pressure in the vessel by feeding hydrogen gas into the heated vessel, and d) cooling and filtering the product produced in steps a through c.

In certain embodiments, the vapor pressure of hydrogen is between about 50 psig to about 1000 psig.

In certain embodiments, the catalyst is selected from the group consisting of a nickel-based catalyst, copper, copper-chromite, platinum and palladium.

In another embodiment, the present disclosure describes a process wherein said hydrogenated blown oil product has a hydroxyl value below about 150.

In certain embodiments, the hydrogenated blown oil product has an iodine value below about 110. In other embodiments, the iodine value is below about 70, and in still other embodiments below about 30.

In one embodiment, the blown oil is derived from an oil selected from the group consisting of fish, animal, vegetable, synthetic and genetically-modified plant oil, and derivatives and mixtures thereof. In other embodiments, the blown oil is derived from a vegetable oil. In certain embodiments, the vegetable oil is linseed or soy oil.

In another aspect, the present disclosure describes a composition comprising a hydrogenated copolymer oil. In an embodiment of this aspect, the hydrogenated copolymer oil has an iodine value below about 110. In certain embodiments, the iodine value is below about 70, and in other embodiments below about 30. Compositions comprising a hydrogenated copolymer oil include vegetable-based jellies and waxes. Other compositions include, but are not limited to, creams, lotions, hair preparations, cosmetics, candles, ointments, lubricants, binders, and coatings. One embodiment of this aspect of the present disclosure is a composition comprising a hydrogenated copolymer oil, wherein the hydrogenated copolymer oil replaces or supplements a petrolatum or micro-crystalline wax material ingredient in the composition. In this embodiment, any product containing a petrolatum or micro-crystalline wax can be reformulated to comprise a hydrogenated copolymer oil, such a hydrogenated copolymer oil reduces the amount or eliminates entirely the requirement of a petrolatum or micro-crystalline wax component in the composition. When such a composition is reformulated in this manner, the composition retains those characteristics attributed to a petrolatum or micro-crystalline wax material, but the composition contains a reduced amount or none of these materials.

In another embodiment, the present disclosure is directed to a vegetable based jelly or wax comprising a hydrogenated copolymer oil, wherein said oil has an iodine value below about 110. In certain embodiments, the iodine value is below about 70, and in other embodiments below about 30. A vegetable based jelly as described herein would be comparable to a petroleum based jelly such as Vaseline® petroleum jelly. In this embodiment the composition can be a semi-solid or wax-like material at a temperature between about 0° C. to about 100° C. possessing characteristics such as Congeal Point (ASTM D938), Drop Melt Viscosity (ASTM D127), Kinematic Viscosity (ASTM D445), Needle Penetration (ASTM D1321), similar to the properties of a petrolatum or micro-crystalline wax.

In another embodiment, the present disclosure describes a composition consisting essentially of a hydrogenated copolymer oil.

The hydrogenated copolymer oil has an iodine value below about 110. In certain embodiments, the iodine value is below about 70, and in other embodiments below about 30. Examples of copolymer oils suitable for hydrogenation include, but are not limited to, dicyclopentadiene and maleic anhydride/polyol oils. With regard to a copolymer oil possessing hydroxyl moieties, such as a maleic anhydride/polyol oil, the hydroxyl value of such an oil may be below about 150. In certain embodiments, the composition consisting essentially of a hydrogenated copolymer oil is a semi-crystalline wax-like material at a temperature between about 0° C. to about 100° C. In this embodiment, the disclosure describes a composition that possesses characteristics such as Congeal Point (ASTM D938), Drop Melt Viscosity (ASTM D127), Kinematic Viscosity (ASTM D445), Needle Penetration (ASTM D1321), similar to the properties of a petrolatum or micro-crystalline wax.

In another embodiment, the present disclosure is directed to a vegetable-based coating comprising a hydrogenated copolymer oil having an iodine value below about 110. In certain embodiments, the iodine value is below about 70, and in other embodiments below about 30. The vegetable based coating described herein would be useful for packaging coatings and the like.

The present disclosure is also directed to a product having similar characteristics as a microcrystalline wax or petrolatum product, wherein the product is formulated using any of the following ingredients in any combination: one or more neat vegetable oils, one or more hydrogenated (including partially hydrogenated) vegetable oils, one or more hydrogenated (including partially hydrogenated) polymerized oils, one or more hydrogenated (including partially hydrogenated) blown oils, one or more hydrogenated (including partially hydrogenated) copolymer oils, a fatty acid ester of a triglycerol and an antioxidant.

In another aspect, the present disclosure describes a process for preparing a hydrogenated copolymer oil composition. The process comprises hydrogenating a copolymer oil. In certain embodiments, hydrogenation comprises reacting the oil under a vapor pressure of hydrogen in the presence of a catalyst. In another embodiment, hydrogenation further comprises:

a) purging a reaction vessel containing a copolymer oil and a catalyst with hydrogen prior to pressurizing with hydrogen, b) heating the pressurized vessel containing the oil and catalyst to a temperature of between about 150° C. to about 400° C., c) adjusting the vapor pressure in the vessel by feeding hydrogen gas into the heated vessel, and d) cooling and filtering the product produced in steps a through c.

In certain embodiments, the vapor pressure of hydrogen is between about 50 psig to about 1000 psig.

In certain embodiments, the catalyst is selected from the group consisting of a nickel-based catalyst, copper, copper-chromite, platinum and palladium.

In another embodiment, the present disclosure is directed to a vegetable based jelly or wax comprising a hydrogenated copolymer/vegetable oil blend, wherein said oil blend has an iodine value below about 110. In certain embodiments, the iodine value is below about 70, and in another embodiment below about 30. A vegetable based jelly as described herein would be comparable to a petroleum based jelly such as Vaseline® petroleum jelly. In this embodiment the composition can be a semi-solid or wax-like material at a temperature between about 0° C. to about 100° C. possessing characteristics such as Congeal Point (ASTM D938), Drop Melt Viscosity (ASTM D127), Kinematic Viscosity (ASTM D445), Needle Penetration (ASTM D1321), similar to the properties of a petrolatum or micro-crystalline wax.

In another aspect, the present disclosure describes a composition consisting essentially of a hydrogenated copolymer/vegetable oil blend. In certain embodiments, the composition consisting essentially of a hydrogenated copolymer/vegetable oil blend is a semi-crystalline wax-like material at a temperature between about 0° C. to about 100° C. The hydrogenated copolymer/vegetable oil blend as described herein has an iodine value below about 110. In certain embodiments, the iodine value is below about 70, and in other embodiments below about 30. In this embodiment, the disclosure describes a composition that possesses characteristics such as Congeal Point (ASTM D938), Drop Melt Viscosity (ASTM D127), Kinematic Viscosity (ASTM D445), Needle Penetration (ASTM D1321), similar to the properties of a petrolatum or micro-crystalline wax.

Examples of copolymer oils suitable for blending with a vegetable oil include, but are not limited to, dicyclopentadiene and maleic anhydride/polyol oils. Vegetable oils suitable for blending with a copolymer oil include any vegetable derived oil or genetically-modified plant oil. In certain embodiments, the vegetable oil in the oil blend is soybean, safflower, canola, castor, sunflower or linseed oil. In other embodiments, the vegetable oil in the oil blend is linseed oil, and the copolymer oil is dicyclopentadiene or maleic anhydride/polyol oil.

In another embodiment, the present disclosure is directed to a vegetable-based coating comprising a hydrogenated copolymer/vegetable oil blend having an iodine value below about 110. In certain embodiments, the iodine value is below about 70, and in another embodiment below about 30. The vegetable based coating described herein would be useful for packaging coatings and the like.

In another aspect, the present disclosure describes a process for preparing a hydrogenated copolymer/vegetable oil composition. The process comprises hydrogenating a copolymer/vegetable oil. In certain embodiments, hydrogenation comprises reacting the oil under a vapor pressure of hydrogen in the presence of a catalyst. In another embodiment, hydrogenation further comprises:

a) purging a reaction vessel containing a copolymer/vegetable oil and a catalyst with hydrogen prior to pressurizing with hydrogen, b) heating the pressurized vessel containing the oil and catalyst to a temperature of between about 150° C. to about 400° C., c) adjusting the vapor pressure in the vessel by feeding hydrogen gas into the heated vessel, and d) cooling and filtering the product produced in steps a through c.

In certain embodiments, the vapor pressure of hydrogen is between about 50 psig to about 1000 psig.

In certain embodiments, the catalyst is selected from the group consisting of a nickel-based catalyst, copper, copper-chromite, platinum and palladium.

In certain embodiments, the hydrogenated copolymer/vegetable oil product has an iodine value below about 110. In other embodiments, the iodine value is below about 70, and in still another embodiment below about 30.

It has been discovered that hydrogenation of the carbon-carbon double bonds in polymerized, blown, copolymer and copolymer/vegetable blend oils increases the solidification point, improves oxidative stability, decreases reactivity and increases crystallinity. It has further been found that such hydrogenated oil compositions display properties similar to petrolatums and micro-crystalline waxes. If only partial hydrogenation of such an oil is carried out, a chemically reactive semi-solid or wax-like material is produced. Partially hydrogenated oils are capable of forming cross-linked network structures. Other materials such as neat vegetable oils, hydrogenated vegetable oils, oil blends, polyglycerol esters and hydrogenated triacylglycerols can be blended with the hydrogenated oils to further modify physical properties as desired.

It has also been discovered that blown oils or copolymer oils containing free hydroxyl moieties can be hydrogenated to yield a product similar to petrolatums and micro-crystalline waxes, or useful in coatings, including but not limited to urethane coatings. Such hydrogenated oils have hydroxyl values below about 150. The hydroxyl moieties can be useful sites for further chemical modifications of the present disclosure.

High erucic acid rapeseed oil (HEAR) is a type of rapeseed oil typically containing between 40 and 50% erucic acid.

Fatty acids are composed of a carboxylic acid attached to an alkyl chain. The alkyl chain may be saturated or unsaturated, and branched, cyclic or straight.

The term "genetically-modified plant oils" refers to an oil derived from a crop source that has been genetically altered or manipulated by a chemical, biological or recombinant technological process, wherein after such a process the genetic material of the crop source is modified.

Examples to demonstrate some of the properties of the compositions of the present disclosure are described herein. Iodine Value is the number of centigrams of iodine absorbed under standard conditions by 1 gram of fat. It is a measure of the average degree of unsaturation. Hydroxyl value is defined as the milligrams of potassium hydroxide equivalent to the hydroxy content in 1 gram of sample material.

Material based on heat-bodied and/or polymerized oils, including dehydrated oils, oils reacted with copolymers, blown oils, maleic treated oils, and reconstituted oils, may be hydrogenated, including partial hydrogenation, as described herein, to provide materials suitable for various commercial applications as described herein. For example, according to certain embodiments, the heat-bodied oils and polymerized oils described herein may be at least partially hydrogenated to provide materials that may be used as a binder material or as a coating material. In other embodiments, the heat-bodied oils and/or polymerized oils, which may or may not be at least partially hydrogenated, may be blended with other biobased material and/or petrochemical derived materials to make compositions as described herein.

As used herein, the term "bioderived" means derived from or synthesized by a renewable biological feedstock, such as, for example, an agricultural, forestry, plant, bacterial, or animal feedstock. As used herein, the term "bio-based" means a product that is composed, in whole or in significant part, of biological products or renewable agricultural materials (including plant, animal and marine materials) or forestry materials. As used herein, the term "petroleum derived" means a product derived from or synthesized from petroleum or a petrochemical feedstock.

According to certain embodiments, polymerized vegetable oils, as described herein, including at least partially hydrogenated polymerized vegetable oils, may be blended with other biobased materials. Non-limiting examples of biobased materials, including materials derived from plant or animal sources, which may be mixed with the polymerized oils of the present disclosure include propylene glycol monoesters ("PGMEs"), monoacylglycerols, diacylglycerols, mixtures of monoacylglycerols and diacylglycerols, esters of dianhydrohexitols, methyl esters, hydrogenated methyl esters, esters of polyols (including sorbitol and sorbitan), ethoxylated fatty acid derivatives, stanols, sterols (such as plant sterols, including soy sterols), stanyl esters, steryl esters, polyglycerol esters, and combinations of any thereof.

For example, according to certain embodiments, the at least partially hydrogenated polymerized oils may be blended with biobased esters, such as, PGMEs. Non-limiting examples of bio-based PGMEs include PGMEs of fatty acids (organic carboxylic acids having from 10-22 carbon atoms in the main chain), such as propylene glycol monostearate, propylene glycol monooleate, propylene glycol monoelaidate, propylene glycol monopalmitate, propylene glycol monomyristate, propylene glycol monolaurate, propylene glycol monolinoleate, propylene glycol monolinolenate, propylene glycol monobehenate, propylene glycol monoerucate, and combinations of any thereof. Various suitable PGMEs have high melting points and good hardness, such that when they are blended with petrolatum-like hydrogenated polymerized oil material may result in a blended material having good hardness, melting point, flexibility and tackiness that may be suitable for an adhesive or a binder material. For example, certain blends of hydrogenated polymerized oils and PGMEs, such as a propylene glycol monostearate, for example a blend comprising from 30% to 70% hydrogenated polymerized oil and 70% to 30% of PGME, may have good hardness, with melting points in the range of 40° C. to 50° C., and a suitable degree of tackiness for use as an adhesive. According to other embodiments where a high melting point may be desired, other high melting point biobased vegetable oil derivatives, such as, for example, hydrogenated castor oil, hydrogenated high erucic acid rapeseed oil ("HEAR"), and the like, may be added to the blend to give higher melting points (about 86° C. for added hydrogenated castor oil and about 71° C. for added hydrogenated HEAR oil). According to other embodiments, the blend of at least partially hydrogenated polymerized oils and biobased esters may comprise stanols or sterols, such as, high melting point stanols or sterols (including but not limited to stanols or sterols with a melting point from about 130° C. to 150° C.). One non-limiting example of a plant sterol includes sitosterol from soybeans which has a melting point of 136° C.-140° C. Blends comprising at least partially hydrogenated polymerized oils and soy or plant stanols or plant sterols (such as sitosterol) may have melting points exceeding 140° C. While not intending to be limited by any interpretation, the high melting point components may help network the rest of the wax mixture up to or near their melting point. For example, the plant sterol and/or plant stanol may act as a nucleating agent to seed crystallization in a crystalline wax-like product.

In other embodiments where a lower melting point may be desired, the at least partially hydrogenated polymerized oil may be blended with a low melting point bio-based vegetable oil derivative, such as, but not limited to, a stanyl ester and/or a steryl ester. Since stanyl esters and steryl esters have low melting points (approx. 30° C. to 50° C.), the resulting blend may have lower melting characteristics.

According to other embodiments, the at least partially hydrogenated polymerized oils may be blended with petrochemical derived materials. For example, according to certain embodiments, the at least partially hydrogenated polymerized oil may be blended with petrochemical derived materials, such as, for example, paraffin waxes, microcrystalline waxes, mineral oils, and combinations of any thereof. Petroleum based materials, such as, paraffin waxes, microcrystalline waxes, mineral oils, and the like, are generally non-polar and miscible with the at least partially hydrogenated polymerized oils of the present disclosure. For example, according to certain embodiments, mixtures and blends of the at least partially hydrogenated polymerized oil and the petroleum based materials may be produced by melting the components, mixing the melted components to give a solution, and allowing the blend or mixture to cool. The blends and mixtures may then be used for various applications as described herein. Forming a blend of the bio-based at least partially hydrogenated polymerized oils and the petroleum based materials may allow for the at least partial replacement of non-renewable petroleum based materials with renewable bio-based materials. According to one non-limiting example, a blend comprising from 30% to 70% hydrogenated polymerized oil and 70% to 30% of a petroleum based material, such as paraffin wax, microcrystalline waxes, and mineral oils, may be used in a variety of applications, such as a coating, as described herein.

Bio-based content of a product may be verified by ASTM International Radioisotope Standard Method D 6866. ASTM International Radioisotope Standard Method D 6866 determines bio-based content of a material based on the amount of bio-based carbon in the material or product as a percent of the weight (mass) of the total organic carbon in the material or product. Both bio-derived and bio-based products will have a carbon isotope ratio characteristic of a biologically derived composition. These methods require the measurement of variations in isotopic abundance between bio-based products and petroleum derived products, for example, by liquid scintillation counting, accelerator mass spectrometry, or high precision isotope ratio mass spectrometry. Isotopic ratios of the isotopes of carbon, such as the $^{13}C/^{12}C$ carbon isotopic ratio or the $^{4}C/^{12}C$ carbon isotopic ratio, can be determined using analytical methods, such as isotope ratio mass spectrometry, with a high degree of precision. Studies have shown that isotopic fractionation due to physiological processes, such as, for example, $CO_2$ transport within plants during photosynthesis, leads to specific isotopic ratios in natural or bioderived compounds. Petroleum and petroleum derived products have a different $^{13}C/^{12}C$ carbon isotopic ratio due to different chemical processes and isotopic fractionation during the generation of petroleum. In addition, radioactive decay of the unstable $^{14}C$ carbon radioisotope leads to different isotope ratios in bio-based products compared to petroleum products. Thus, bio-based products may be differentiated from petroleum derived products.

The materials, according to various embodiments of the present disclosure, may comprise at least one of a heat bodied oil and an at least partially hydrogenated polymerized oil. The materials may be used as a binder. For example, according to certain embodiments, the material may be a binder, such as a hot melt adhesive, a binder for a wood composite material, a binder for a feed block, a binder for an agricultural product, an asphalt binder, or a binder for a personal care product. Various embodiments of the binders are discussed herein.

According to various embodiments of the present disclosure, the at least partially hydrogenated polymerized oil may be blended with a vegetable oil product, such as, for example, soybean oil, to provide a wax suitable for use in various applications, such as, for example, a candle, a fireplace log, or a fire starting composition. According to other embodiments, other bio-based esters, as described herein, may be added to the blend to modify the characteristics of the candle. For example, addition of hydrogenated vegetable oil, sterols, stanols, steryl esters, stanyl esters, and/or PGMEs may result in candle wax having modified characteristics, such as, increased hardness, changes in texture, and changes in morphology. According to other embodiments, the at least partially hydrogenated polymerized oils of the present disclosure may be blended with petroleum based materials, such as, paraffin wax, microcrystalline waxes, mineral oils, and the like, to form a wax material that may be used as a candle wax. The materials of the present disclosure may be mixed with a biologically derived oil product, a petroleum derived wax, or any combinations of these at any desired amount ranging from an intentionally incorporated trace, such as about 0.01 percent by weight to 100 percent by weight.

According to other embodiments, the at least partially hydrogenated polymerized oils of the present disclosure may be interesterified with triacylglycerol oils, for example, vegetable oils, which may be non-hydrogenated, partially hydrogenated, and fully hydrogenated. As used herein, the terms "interesterified" and "interesterification" refer to a chemical reaction in which the ester functional groups in the two or more components exchange the acyl portion of the at least one of the esters of triacylglycerols in vegetable oils (including hydrogenated and polymerized vegetable oils), as shown in equation 1.

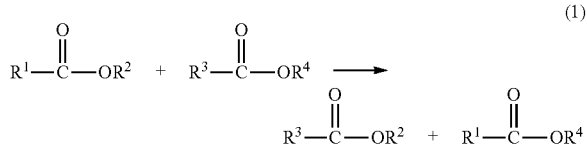

For example, the hydrogenated heat-bodied or polymerized oils of the present disclosure may be interesterified with hydrogenated HEAR oil to produce a composition having a high monoester content. Suitable procedures for interesterification include, but are not limited to, those described in U.S. Pat. Nos. 2,442,531, 2,442,532, and 6,723,863, the disclosures of each of which are incorporated by reference herein in their entirety, including enzymatic interesterification, acid mediated interesterification, and base mediated interesterification. According to certain embodiments, interesterification of the at least partially hydrogenated heat-bodied or polymerized oil with other vegetable oils, such as hydrogenated HEAR oil may be used to produce a microcrystalline wax material. The microcrystalline wax material may be composed of primarily bio-based products.

According to other embodiments, one or more carbon-carbon double bonds in the molecular structure of the polymerized oils and partially hydrogenated polymerized oils of the present disclosure may be subjected to epoxidation. Epoxidation, either by a chemical epoxidation or an enzymatic epoxidation, converts the one or more carbon-carbon double bonds on the polymerized oil to an epoxide. According to various embodiments, at least one up to all of the remaining carbon-carbon double bonds of the polymerized oil may be converted to epoxides. The resulting epoxy systems may react with nucleophiles, such as amines/polyamides and hydroxyls. In other embodiments, the epoxidized polymerized oils may be used as acid scavengers (such as HCl scavengers) or as plasticizers, lubricants, or additives in PVC or other plastic compounding application.

According to other embodiments, the at least partially hydrogenated polymerized oils of the present disclosure may be utilized in adhesive applications, such as, hot melt adhesive applications. For example, at least partially hydrogenated polymerized vegetable oils, such as soybean oil, may be used as a substitute for at least a portion of the petroleum waxes used in the manufacture of hot melt adhesives.

Waxes that are to be used in hot melt adhesives must have a relatively sharp melt point to yield an adhesive with a short "set speed" and controllable open time. As used herein, the term "sharp melt point" means the hot melt adhesive melts over a narrow temperature range. As used herein, the term phrase "short set speed" means the hot melt adhesive sets or hardens over a short period of time. As used herein, the term phrase "open time" means the time a hot melt adhesive takes to solidify to a point where it can no longer bond with the intended article. The melt point is another property in addition to compatibility. The wax must also allow for a reduction of overall adhesive viscosity to allow for the proper application or coating of the hot melt adhesive on the intended surface. Generally, hot melt adhesive formulations are heated to 148° C. to 177° C. prior to application in order to reduce viscosity. The wax must be stable at these temperatures to allow for extended periods as a molten product prior to application. Other components, such as, but not limited to, antioxidants (for example, hindered phenols) and free radical scavengers (for example, but not limited to, butylated hydroxy toluene ("BHT"), butylated hydroxy anisole ("BHA"), and Irganox 1010 (commercially available from Ciba Corp., Tarrytown, N.Y.)) may be added to the adhesive compound to further enhance thermal stability.

For example, according to certain embodiments, the present disclosure provides for a material comprising at least one of a heat bodied oil and a hydrogenated polymerized oil wherein the material is a binder such as a hot melt adhesive. The hot melt adhesive may comprise from 40% to 50% by weight of the at least partially hydrogenated polymerized oil, 40% to 50% by weight of a hydrocarbon resin, and 10% to 20% of a hydrogenated vegetable oil, such as, but not limited to, a hydrogenated soybean oil or a hydrogenated oil selected from the following: butterfat, cocoa butter, cocoa butter substitutes, illipe fat, kokum butter, milk fat, mowrah fat, phulwara butter, sal fat, shea fat, borneo tallow, lard, lanolin, beef tallow, mutton tallow, tallow, animal fat, camelina oil, canola oil, castor oil, coconut oil, coriander oil, corn oil, cottonseed oil, hazelnut oil, hempseed oil, jatropha oil, linseed oil, mango kernel oil, meadowfoam oil, mustard oil, neat's foot oil, olive oil, palm oil, palm kernel oil, peanut oil, rapeseed oil, rice bran oil, safflower oil, sasanqua oil, shea butter, soybean oil, sunflower seed oil, tall oil, tsubaki oil, tung oil, vegetable oils, marine oils, menhaden oil, candlefish oil, cod-liver oil, orange roughy oil, pile herd oil, sardine oil, whale oils, herring oils, triacylglycerols, diacylglycerols, monoacylglycerols, triolein, palm olein, palm stearin, palm kernel olein, palm kernel stearin, triacylglycerols of medium chain fatty acids, and derivatives, conjugated derivatives, genetically-modified derivatives and mixtures thereof. According to certain embodiments of the hot melt adhesive, wherein the hydrogenated polymerized oil is a partially hydrogenated polymerized oil, the partially hydrogenated polymerized oil in the binder may undergo an oxidative curing. According to certain embodiments wherein the partially hydrogenated polymerized oil undergoes an oxidative curing, the hot melt adhesive may be a thermosetting resin that thermosets during the curing and will not re-melt upon reheating. According to the various embodiments, the at least partially hydrogenated polymerized oils may act as a tackifier in the hot melt application and also may impart both flexibility and good low-temperature adhesion to the adhesive.

According to other embodiments, the at least partially hydrogenated polymerized oils of the present disclosure may be used as part of a binder for wood composite applications. For example, the materials according to certain embodiments of the present disclosure may be a binder for a wood composite material. In one embodiment, the binder may be applied in a molten form (that is, the molten binder material may be melted and mixed with the wood composite materials) and then molded into the final product and set upon cooling. In another embodiment, the binder may be applied in the form of an emulsion, that is, the emulsion comprising the binder material may be mixed with the wood composite materials, and the mixture molded into the final product. Further, according to certain embodiments, the partially hydrogenated polymerized oils in the binders may be crosslinked after formation of the wood composite product, for example by oxidative curing to form crosslinks between double bonds in the polymerized oil. The resulting crosslinked polymerized oil binder system may be more rigid than the non-crosslinked polymerized oil binder and may impart additional dimensional stability to the wood composite product. The addition rate of the at least partially hydrogenated polymerized oils of the present disclosure may vary from 0.5% to 50% by weight. The lower limit of addition can alternatively be 1%, 1.25%, 2%, 2.5%, 3%, 4%, or 5% by wood weight, on the same basis. The upper limit of addition can alternatively be 50%, 40%, 30%, 25%, 20%, 15%, 14%, 13%, 12%, 11%, 10%, 8%, 6%, or 5% by wood weight, on the same basis. In comparison to the use of non-polymerized vegetable oils as wood composite binders, the wood composite binder materials of the present disclosure offer higher molecular weight derivatives. For example, partially hydrogenated polymerized oil, for example with and IV of 50 or more will polymerized under oxidative curing to form a cross linked network with a large molecular weight. It is believed that less curing is required to reach the gel point with the polymerized oils than with triacylglycerol oils, which have a lower average molecular weight than polymerized oils, including partially hydrogenated polymerized oils. In other embodiments, the binder comprising the at least partially hydrogenated polymerized oil may also impart moisture resistance to the wood composite product by forming an at least partially moisture resistant layer on at least one surface of the wood composite material.

According to other embodiments, the at least partially hydrogenated polymerized oils of the present disclosure may be used as a binder for a feed block and other agglomerated forms of animal feed. Feed blocks and other agglomerated forms of animal feed may be solidified mixtures of agro-industrial by-products used for supplementing poor quality roughages and native rangeland forages. They may be used as a catalyst supplement that may provide a fractionated, synchronized, and balanced supply of nutrients (i.e., energy, nitrogen, minerals, vitamins, and the like) for animals consuming diets that lack one or more of the nutrients necessary for a healthy diet. In addition, feed blocks and other agglomerated forms of animal feed may also act as cost-effective supplements and as a means for preserving one or more high moisture agro-industrial by-products (for example, tomato pulp, olive cake, and the like). Feed blocks and other agglomerated forms of animal feed may provide a useful alternative or complementary product to other feed products. Feed blocks and other agglomerated forms of animal feed are easy to handle, transport, and can be made on site (i.e., at the animal production facility) as well as off site. A variety of formulae may be produced incorporating different levels of urea, binders and agro-industrial by-products, depending on the animal's local needs and by-product availability. The at least partially hydrogenated polymerized oils of the present disclosure may be incorporated into the feed formulations at 0.5 to 5% by weight of the total formula. In certain embodiments, feed blocks and other agglomerated forms of animal feed benefit from the hydrophobicity of the at least partially hydrogenated polymerized oils of the present disclosure. The hydrophobicity of the at least partially hydrogenated polymerized oils of the present disclosure confers water-repellent characteristics to the feed blocks and other agglomerated forms of animal feed, which confers improvements in weatherization of the feed blocks and other agglomerated forms of animal feed. Therefore, according to certain embodiments, the feed blocks or other agglomerated forms of animal feed may be at least partially moisture resistant. Weatherization refers to the leaching of nutrients from feed blocks and other agglomerated forms of animal feed on exposure to water, sunlight, and/or wind.

Nutrients and other components may be encapsulated in a moisture resistant feed block form using the at least partially hydrogenated polymerized oils of the present disclosure. Petroleum based products, such as, pariffinic and microcrystalline waxes, are used as binders to make certain feed block formulations. In addition, use of the binder materials disclosed herein allows for the replacement of at least a portion of the petroleum products with the bio-based products. When consumed by the animal, the polymerized oil containing binder material may be hydrolyzed by the digestive system of the animal to provide additional energy. According to certain embodiments, the feed blocks and other agglomerated forms of animal feed may further comprise one or more other ingredients, such as, for example, protein, non-protein nitrogen sources (such as, but not limited to, urea), vitamins, minerals, palatability increasing agents, and agro-industrial by-products. Agro-industrial by-products include by-products produced during the production of agricultural products and/or industrial products and include, for example, tomato pulp, olive cake, date pulp, rice bran, vegetable meals, oilseed meals, animal proteins, grain co-products, such as, brewery grains, distiller's grains, and corn germ meal, molasses, poultry waste, fermentation co-products, such as fermentation biomasses, yeast creams and yeast cakes, plant botanical extracts, such as capsaicin, clove oil, cinnamaldehyde, and fenugreek, and various combinations thereof.

In other embodiments, the at least partially hydrogenated polymerized oil may be used as a binder for an agricultural product, such as a fertilizer, a pesticide, an herbicide, a fungicide, or a rodenticide. Certain agricultural products comprise components, including active ingredients and inert ingredients, which may be bound together with a binder, for example a binder comprising the at least partially hydrogenated polymerized oil, to form an aggregate particulate. The at least partially hydrogenated polymerized oils of the present disclosure may be incorporated into the aggregate formulations at 0.5% to 25% of the total formula by weight. In another embodiment, the at least partially hydrogenated polymerized oils may be incorporated into the aggregate formulations at from 5% to 10% of the total formulation by weight. Alternatively, other agricultural products may comprise a central portion in which an active ingredient, such as, a fertilizer, a pesticide, an herbicide, a fungicide, or a rodenticide, may be bound to at least a portion of the surface of the central portion. For example, according to one embodiment, the at least partially hydrogenated polymerized oil may at least partially bind the active ingredient to at least a portion of a surface of the agricultural product. Combinations of any of the active ingredients, for example, but not limited to, the combination of a fertilizer and one of a pesticide, an herbicide, and a fungicide, in the agricultural product are also contemplated. In certain embodiments, the agricultural product comprising the at least partially hydrogenated polymerized oil as a binder may be at least partially moisture resistant.

In certain embodiments where the material comprises a binder for a rodenticide, the active ingredient comprising one or more compounds that are toxic if consumed or inhaled by rodents or absorbed through the rodents skin, including those substances that have an $LD_{50}$ of less than 50 mg/kg body weight. Suitable active rodenticides include, but are not limited to, thallium, sodium monofluoroacetate, strychnine, zinc phosphide, yellow phosphorous, arsenic, and combinations of any thereof. The various active ingredients (bound together with the binder material) may be mixed with an edible ingredient, such as, for example, molasses or peanut butter, and distributed in an area infested with rodents.

In other embodiments wherein the material is a binder for an agricultural product, the at least partially hydrogenated polymerized oil may provide for the controlled release of the agricultural product. For example, the binder comprising the at least partially hydrogenated polymerized oil may provide for the controlled release of a fertilizer, a pesticide, an herbicide, or a fungicide, by slow decomposition or removal of the binder by certain environmental conditions, for example, by dissolution by rain water, oxidative decomposition by UV light, melting by sunlight or heat, or decomposition by microbes, to release the active ingredient(s) (i.e., the active fertilizer component(s), pesticide(s), herbicide(s), or fungicide(s)). As the binder decomposes or is removed, the active ingredient may be exposed or released.

In pesticide formulations, inert ingredients may be used as carrier materials. These inert ingredients comprise up to 99.8% of the pesticide formulation and may include petroleum distillates. According to certain embodiments, these petroleum derived products may be at least partially replaced with the bio-based products of the present disclosure. For example, the at least partially hydrogenated polymerized oil may be used, in place of, or in addition to, petroleum products, to bind or adhere the pesticides to surfaces and/or control the pesticides release over time. For example, when the more volatile components of the pesticide formulation evaporate, the active ingredient(s) remain in the residue comprising the at least partially hydrogenated polymerized oil. Further, the at least partially hydrogenated polymerized oil may allow for the slow release of the pesticide over time and prevent it from being easily wash away by rain or irrigation.

Other embodiments of the material comprising the at least partially hydrogenated polymerized oil as a binder include use of the material as an asphalt binder. Asphalt is a plastic material which melts and flows at high temperatures and becomes hard and glassy at low temperatures. Asphalt may comprise a complex cementitious mixture of bitumens derived from petroleum manufacturing. Polymers, such as styrene butadiene polymers, have been added to the asphalt mixture to adjust or manipulate certain characteristics of the resulting hardened asphalt. Styrene butadiene modified asphalts may demonstrate greater ability to withstand temperature extremes. For example, styrene butadiene modified asphalt is more viscous at high temperatures and therefore resistant to rutting or shoving, and more ductile at low temperatures and therefore less brittle, more resistant to fatigue cracking, and provide a more adhesive binder. According to certain embodiments, the binder materials of the present disclosure comprising the at least partially hydrogenated polymerized oil may be used as a binder material in asphalt applications.

According to certain embodiments, the at least partially hydrogenated heat bodied/polymerized oils demonstrate a melting point profile that may be suitable for use in asphalt applications. For example, one embodiment of the at least partially hydrogenated polymerized oil (OKO M-2½, a polymerized linseed oil) has a broad melting point from about 0° C. to 25° C., with two secondary melting points at about 30° C. and ranging from 35° C. to 47° C. The at least partially hydrogenated polymerized oils of the present disclosure may be incorporated into the asphalt formulations at 0.5-25% of the total formula by weight. This melting point profile allows the binder to have melted domains and crystalline domains, which could help with impact resistant over a range of temperatures. In addition, according to certain embodiments, the binder comprising the partially hydrogenated polymerized oils could undergo an oxidative cure to crosslink the polymerized oil chains, which may result in an asphalt with improved durability and/or elastomeric polymer formation. In still other embodiments, a blend of the at least partially hydrogenated polymerized oil and non-hydrogenated polymerized oil could be used in asphalt binder applications. Non-hydrogenated polymerized oils have very low melting points (for example, according to one embodiment, from −30° C. to −3° C.) and the combination with at least partially hydrogenated polymerized oils may give a mixture with a desired range of temperature performance. Further, replacing at least a portion of the petroleum derived components in asphalt mixtures with materials comprising bio-based polymerized oil binders results in an asphalt composition that has a reduced content of petroleum derived components.

In other embodiments, the material comprising the at least partially hydrogenated polymerized oil may be used as a binder for a personal care product. For example, many personal care products, such as, for example, lotions, creams, moisturizers, hair gels, cosmetics, makeup, deodorant sticks, lip balm, sun screen products, lubricants, and jellies, may include petroleum derived products, such as a petrolatum product. According to various embodiments, the at least partially hydrogenated polymerized oils of the present disclosure may replace at least a portion of one or more petrolatum products as a binder in a personal care product. The at least partially hydrogenated polymerized oil may be incorporated into cosmetic formulations at from 0.5% to 100% of the total formula by weight. Suitable at least partially hydrogenated polymerized oils include those polymerized oils derived from soybean oil, linseed oil, castor oil, sunflower oil, safflower oil, canola oil, palm olein, or rapeseed oil.

Petrolatum and other petroleum products are believed to cause some problems upon application to the skin. For example, petroleum jelly, such as VASELINE®, cannot readily be absorbed by healthy skin and therefore creates a thin film on the surface of the skin upon application. This thin film can block pores and prevent normal function of the skin. Because of the hydrocarbon nature of the petrolatum product, the skin is not equipped to break down these compounds. Unlike the petrolatum-type products, personal care products comprising the materials of the present disclosure may be more readily decomposed by the skin. For example, the polymerized oils of the present disclosure comprise ester bonds, which may be hydrolyzed by esterases and lipases in the skin.

The polymerized oil products may require deodorization to remove certain impurities, such as free fatty acids which may cause itching and skin sensitization. Deodorization may be effected using conditions known to those having ordinary skill in the art, for example using conditions similar to those for deodorizing vegetable oils, such as soybean oil. The deodorization may be effected on the vegetable oil prior to conversion to a polymerized oil, after conversion to a polymerized oil but prior to hydrogenation, or after polymerization and hydrogenation.

In other embodiments of the present disclosure, the materials comprising at least one of a heat bodied oil and an at least partially hydrogenated polymerized oil may be a coating. For example, the coating material comprising the at least partially hydrogenated polymerized oil may be used, for example, as a packaging coating, an edible food coating, an agricultural product coating, and a concrete mold release coating.

The coating materials may further comprise vegetable oil esters and/or petrochemical products. For example, according to certain embodiments, the coating materials of the present disclosure may comprise a blend of the at least partially hydrogenated polymerized oil and a vegetable oil ester. Suitable vegetable oil esters that may be blended with the at least partially polymerized oil include, but are not limited to, alkyl esters of hydrogenated, partially hydrogenated, and non-hydrogenated vegetable oils, such as, for example, methyl esters of hydrogenated soybean oil, methyl esters of hydrogenated HEAR oil, methyl esters of palm oil, and combinations of any thereof. In other embodiments, the coating materials described herein may be blended with a petrochemical product, such as, but not limited to, paraffin waxes, microcrystalline waxes, mineral oil, petroleum greases, and combinations of any thereof. According to certain embodiments the coatings described herein may be moisture resistant wax coatings.

In certain embodiments, the coating materials of the present disclosure may be a coating for an agricultural product, such as, a fertilizer coating, a pesticide coating, an herbicide coating, a fungicide coating, a rodenticide coating, or a coating for combinations of any of these agricultural products. For example, many fertilizers are water soluble and would dissolve and wash into the soil or be absorbed by the plant during the first irrigation or rainfall. This may limit the amount of fertilizer that could be applied during a given application and may require costly reapplication of the fertilizer. Similar problems may exist with pesticides, herbicides, fungicides, and rodenticides. One solution to this problem is to coat or encapsulate the water soluble active ingredient, for example, the fertilizer, the pesticide, the herbicide, fungicide, and/or the rodenticide, in a water insoluble coating, an at least partially water insoluble coating and/or an at least partially moisture resistant coating, such as, the at least partially hydrogenated polymerized oils of the present disclosure. According to these embodiments, the polymerized oil coating may provide for the release of the water soluble core material over an extended period of time. For example, over time, the polymerized oil coating may decompose or be removed upon prolonged exposure to the environment, such as sunlight (e.g. UV radiation), rain, heat, and/or cold, or by microbial decomposition.

According to certain embodiments, the agricultural product may be in a particulate form and the coating material comprising the polymerized oil may have a solid content, a glass transition temperature, and a blocking temperature sufficient to promote coating of the agricultural product without causing agglomeration of the particulates. Use of the polymerized oils of the present disclosure as a coating may allow for the reduction or elimination of alkyd resins, polyvinylidene chloro-based latex compositions, or other petroleum derivatives in the coating materials. For example, hydrogenated or partially hydrogenated polymerized oils may be used directly in a coating with no further oxidative cross-linking cure since they provide a flexible, hydrophobic, higher molecular weight coating. If the coating comprises a partially hydrogenated polymerized oil (IV ~50-100), the coating may be cured to form a thermoset polymer, as described herein. Curing of the partially hydrogenated polymerized oils may be cured using an initiator, such as a free radical polymerization initiator, for example, a ketone peroxide, such as, methyl ethyl ketone peroxide, benzoyl peroxide, and cumene peroxide. In other embodiments a curing or polymerization promoter may be including in the coating. Such a promoter may decrease the time of curing, for example, by speeding up the polymerization reaction. Examples of promoters include, but are not limited to, metals or metal compounds, such as cobalt or vanadium and their compounds. In other embodiments, the coating may be cured without addition of an initiator, such as, by a thermal or light (hv) mediated cure. Thus, the present disclosure may provide for coated or encapsulated agricultural products comprising 100% bio-based material, in comparison to the petrochemical derived materials seen in the prior art.

In other embodiments, the at least partially polymerized oils may be used as a coating for an food product or an animal feed. For example, according to one embodiment, the coatings comprising the at least partially polymerized oils of the present disclosure may be used as an animal feed coating. That is, animal feed compositions and supplements may be coated with the coating compositions of the present disclosure to prevent degradation by environmental conditions and/or ready digestion by the upper digestive tract.

According to one embodiment wherein the coating is an animal feed composition coating configured to prevent degradation of the composition by environmental conditions, the coating may be an at least partially water resistant coating, such that the coated feed composition is at least partially resistant to degradation (e.g., loss of nutrients, structural integrity, and/or palatability) by exposure to rain and/or wind. In other embodiments, the coating may provide the coated materials resistance to degradation by microbes, mold, insects, and the like. In addition, use of the coating of the present disclosure may improve physical handling characteristics and shelf-life stability of the coated animal feed compositions and supplements. In specific examples of agglomerated, loose mineral applications, the at least partially polymerized oils of the present disclosure may be used to agglomerate the micronutrients (for example, but not limited to, zinc, manganese, copper, cobalt, vitamins, and the like) to achieve a more uniform particle size for the finished mineral product when combined with macro-ingredients (e.g., monocalcium phosphate, limestone, defluorinated phosphate, and other macro-ingredients know in the art). Coatings comprising the at least partially polymerized oils may comprise from 0.1% to 5% by weight of the total feed formula.

According to other embodiments, the coatings comprising the at least partially hydrogenated polymerized oils of the present disclosure may provide for increase rumen bypass of proteins, fats, and non-protein nitrogen (such as, urea) in animal feed compositions by reducing the rumen fermentation of the animal feed compositions. For example, in certain cases it may be desirable to increase the amount of protein in a ruminant's diet that passes substantially intact through the rumen and into the latter portions of the ruminant digestive tract (i.e., small intestine). Thus, the coating comprising the at least partially hydrogenated polymerized oil may prevent digestion of at least a portion of the animal feed composition in the rumen by preventing the rumen microbes from metabolizing at least a portion of the proteins, fats, and non-protein nitrogen in the animal feed. In certain embodiments, the coating may be a coating on an animal feed such as an animal feed comprising an ingredient selected from the group consisting of animal proteins, animal fats, plant proteins, plant oils, non-protein nitrogen sources, and combinations of any thereof, wherein an amount of the animal feed passing at least partially intact through a rumen of a ruminant is increased compared to an animal feed that is not coated with the animal feed coating. In certain embodiments, the animal feed coatings may comprise between 0.01% to 10% by weight of the total animal feed.

In another embodiment, the coatings materials comprising the at least partially hydrogenated polymerized oils of the present disclosure may be an edible food coating, such as a fruit coating or a vegetable coating.

For example, in one embodiment, the coating material may be an edible fruit coating or a vegetable coating. Edible lipid coatings for fruits and vegetables may provide a barrier for prevention of moisture loss as well as giving the fruit or vegetable a desirable glossy surface and color. However, in order for the coating to be effective, the lipid must adhere to the fruit/vegetable surface, form a continuous barrier, and remain intact over a wide temperature range. Attempts to use liquid fats, such as vegetable oils, for edible coatings can result in the coating material's failure to adhere to the fruit/vegetable surface, particularly at warmer temperatures. Attempts to use other lipids such as solid fats and paraffin wax resulted in a coating that may be too brittle when cool or too thick to apply directly (depending on the nature of the fat). According to certain embodiments, the at least partially hydrogenated polymerized oils of the present disclosure may be used in edible coatings for fruits and vegetables. The polymerized oils may provide a coating that is easily applicable, adheres well to the food surface, forms a continuous barrier (such as a moisture barrier), and remain intact, yet pliable over a wide temperature range. In certain embodiments, the coating material may comprise the at least partially hydrogenated polymerized oil. In other embodiments, the coating material may further comprise at least one emulsifier, such as, but not limited to, monoacylglycerols and diacylglycerols, gums, such as xanthan gum, propylene glycol alginate, carboxy methyl cellulose, gum Arabic, locust bean gum, maltodextrin, fatty alcohol ethoxylates, fatty acid ethoxylates, sorbitan derivatives, polyglycerol esters, lecithin, and combinations of any thereof. According to certain embodiments, the coating material may comprise from 0.01% to 50% by weight of the at least partially hydrogenated polymerized oil. The coating material may be applied to the fruit or vegetable as an emulsion, such as a lipid hydrocolloid emulsion, that forms a continuous or partial barrier. The resulting edible coating will maintain flexibility (i.e., not flake off) over a wide temperature range.

In other embodiments, the coatings comprising the at least partially hydrogenated polymerized oil of the present disclosure may be a packaging coating. In one embodiment, the material may be a packaging coating for a corrugated cardboard material. In another embodiment, the coating material may be a flexible packaging coating. While hydrogenated vegetable oil has been used as a packaging coating for corrugated cardboard, the hydrogenated vegetable oil does not readily penetrate the cardboard surface and had a tendency to crack and flake when the cardboard was bent. In contrast, the packaging coating material of the present disclosure demonstrates good surface penetration and does not readily crack or flake. The resulting coating also shows excellent moisture resistance.

According to various embodiments wherein the coating material is a packaging coating, the coating material may be applied to at least a portion of a surface of the packaging material, for example by spraying the coating material onto the portion of the packaging surface, or by dipping the packaging material into the coating material, such as after the coating material has been heated into liquid form. Excess liquid coating material may be removed, such as, by shaking, agitating, or wiping such that the coating material forms a smooth coating having a substantially uniform thickness over the coated portion of the packaging surface. Upon cooling, the coating material may solidify into a wax coating that maintains flexibility and moisture resistance. In certain embodiments, the coating material may further comprise esters, such as methyl esters (for example partially hydrogenated soybean methyl esters, methyl esters of hydrogenated soybean oil, methyl esters of hydrogenated HEAR oil, methyl esters of palm oil, methyl esters of fractionated oils, and combinations of any thereof) and propylene glycol monoesters (for example propylene glycol monostearate). For example, lower molecular weight methyl esters may improve surface penetration of the coating, aiding overall adhesion and reducing flaking and cracking. Packaging coating of the present disclosure comprising additional esters, may comprise from 0.01% to 30% by weight of the at least partially hydrogenated polymerized oil and 30% to 70% by weight of the additional esters.

In other embodiments, the packaging coating material for cardboard, such as corrugated cardboard, may comprising the at least partially hydrogenated polymerized oil and a petroleum derived wax. The at least partially hydrogenated polymerized oil may be blended with the petroleum derived wax and then the cardboard may be coated with the blend. According to certain embodiments, the packaging coating material may comprise from 0.01% to 10% by weight of the at least partially hydrogenated polymerized oil. The coated cardboard may then be resistant to moisture and also resistant to cracking and/flaking when the cardboard is bent.

In still other embodiments, the coating materials of the present disclosure may comprise a concrete or cement release coating. During the pouring and curing of concrete/cement, the concrete/cement may adhere to the surface of the mold or form during hardening, resulting in a finished product in which the surfaces are pitted and uneven. Coating at least a portion of the mold or form surface with a release coating may prevent adhesion of the concrete/cement. The at least partially hydrogenated polymerized oils of the present disclosure may be used as a concrete/cement release coating.

In certain embodiments, where the coating comprising the at least partially hydrogenated polymerized oil is a concrete mold release coating, the coating material may further comprise at least one additional component, such as, for example, a vegetable oil, an alcohol (for example, ethanol, propanol, butanol, and mixture thereof), a fusel oil mixture, a lactate ester (such as ethyl lactate), a fatty acid methyl ester, a propylene glycol monoester, and combinations of any thereof. For example, according to certain embodiments, the concrete mold release coating may comprise from 0.01% to 10% by weight of the at least partially hydrogenated polymerized oil.

Other embodiments of the present disclosure provide for a candle wax or candle comprising an at least partially hydrogenated polymerized oil. The candles according to these embodiments may be a gel candle or candle wax (i.e., a container candle) or a hard candle or candle wax, depending on the degree of hydrogenation of the polymerized oil (that is, the greater degree of hydrogenation, the harder the candle material. In certain embodiments, the candle wax or candle may optionally comprise at least one additional additive, such as a vegetable oil, an alkyl ester (such as a propylene glycol monoester), a perfume, a scent, a petroleum derivative (such as a paraffin wax or other petroleum-based wax) and combinations of any thereof. These additional additives may modify the waxy structure of the candle, for example, to provide a smooth appearance without noticeable crystallinity, a desirable morphology and/or texture. The resulting candles are shelf stable, showing no cracking or discoloration after storage for one year at room temperature.

According to other embodiments, the present disclosure provides a polymer composition comprising the heat bodied oils or partially hydrogenated polymerized oil, wherein at least one of the remaining carbon-carbon double bonds in the heat bodied/partially hydrogenated polymerized oil has been converted to at least one epoxide. The IV value of the partially hydrogenated polymerized oil may range from essentially zero (i.e. greater than zero) up to the IV of the initial polymerized oil. In certain embodiments, the IV value for the partially hydrogenated oil may range from 50 to 120. The at least one of the remaining carbon-carbon double in the partially hydrogenated polymerized oil may be converted to the at least one epoxide by either a chemical or enzymatic epoxidation method. For example, suitable chemical epoxidation methods include hydrogen peroxide epoxidation, peroxy acid epoxidations, oxone epoxidations, and other epoxidation methods known in the art. Enzymatic epoxidations may involve epoxidase enzymes. In certain embodiments all of the remaining carbon-carbon double bonds are epoxidized.

The polymer composition wherein at least one of the remaining carbon-carbon double bonds of the partially hydrogenated polymerized oil has been converted to a least one epoxide may be used in a variety of chemical reactions to produce new polymer compositions. The epoxy-bearing polymerized oils may react with nucleophiles (via nucleophilic attack, for example by amines, alcohols, water, and other nucleophiles) to produce a ring opened alcohol product. For example, acid or base catalyzed ring opening may produce alcohols (hydride as nucleophile), vicinal diols (water as nucleophile), 1,2-hydroxy ethers (alcohol as nucleophile), 1,2-amino alcohols (amine as nucleophile), 1,2-hydroxy esters (carboxylate as nucleophile), and the like. The resulting hydroxyl polymerized oils may be used as a component in a polyurethane polymerization. For example, polymerized oils having, on average, two or more hydroxyl groups per molecule may be reacted with a diisocyanate to produce a polyurethane. The resulting polyurethane may be suitable for use in fibers, hard and soft elastomers, coatings and adhesives, flexible and rigid foams, and thermoplastics and thermosetting plastics. Thus, certain embodiments of the present disclosure contemplate a polyurethane comprising at least one of a heat bodied oil or an at least partially hydrogenated polymerized oil.

Alternatively, the epoxy containing polymerized oil may be used as an HCl scavenger. In other embodiments, the epoxy containing polymerized oil may be used as a plasticizer, a lubricant, and/or an additive in PVC or other plastic compounding applications. In certain embodiments, the epoxidized polymerized oils may be added into epoxy coating/composites as part of an epoxy resin system.

In other embodiments, the present disclosure provides for a grease comprising an at least partially hydrogenated polymerized oil and at least one metal salt of a free fatty acid. For example, polymerized oils that have been kettle-bodied without vacuum may have a higher free-fatty acid content than those produced under vacuum. Such polymerized oils may be used as a heavy grease for lubrication applications. The free fatty acids in the polymerized oil may be converted to the metal salt, such as the lithium salt, to produce a stabilized grease type composition. However, unlike most typical greases which are derived from petroleum sources, the grease comprising the polymerized oil will be 100% bio-based. According to various embodiments, the grease may comprise from 0.01% to 100% by weight of the at least partially hydrogenated polymerized oil.

Various embodiments of the present disclosure will be better understood when read in conjunction with the following non-limiting Examples. The procedures set forth in the Examples below are not intended to be limiting herein, as those skilled in the art will appreciate that various modifications to the procedures set forth in the Examples, as well as to other procedures not described in the Examples, may be useful in practicing the invention as described herein and set forth in the appended claims.

EXAMPLES

Example 1

Hydrogenation of P—S Gardener Viscosity Heat Bodied Linseed Oil

Alinco Q (commercially available from Archer Daniels-Midland, Decatur, Ill., (hereinafter "ADM")) was used as the starting material. The raw material specifications of Alinco Q include a Gardener viscosity of P—S and an iodine value of 130-150. Alinco Q (600 g) was added to a 1 L stainless steel reaction vessel with 3 g of a nickel catalyst (G-53, Sud Chemie, Louisville, Ky.). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig for 16 h.

Example 2

Hydrogenation of X Gardener Viscosity Heat Bodied Linseed Oil

Alinco X (ADM) was used as the starting material. The raw material specifications of Alinco X include a Gardener viscosity of X and an iodine value of 120-130. Alinco X (600 g) was added to a 1 L stainless steel reaction vessel with 3 g of a nickel catalyst (G-53, Sud Chemie, Louisville, Ky.). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig for 16 h. The reaction was then cooled and filtered to remove the nickel catalyst. The IV of the final product was 10.5.

Example 3

Hydrogenation of X Gardener Viscosity Heat Bodied Soybean Oil

Heat bodied soybean oil with an X Gardener viscosity (ADM) was used as the starting material. X-bodied soy (600 g) was added to a 1 L stainless steel reaction vessel with 6 g of a nickel catalyst (G-53, Sud Chemie, Louisville, Ky.). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig for 16 h. The reaction was then cooled and filtered to remove the nickel catalyst.

Example 4

Hydrogenation of Y Gardener Viscosity Heat Bodied Linseed Oil

Alinco Y (ADM) was used as the starting material. The raw material specifications of Alinco Y include a Gardener viscosity of Y and an iodine value of 120-130. Alinco Y (600 g) was added to a 1 L stainless steel reaction vessel with 6 g of a nickel catalyst (G-53, Sud Chemie, Louisville, Ky.). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig for 16 h. The reaction was then cooled and filtered to remove the nickel catalyst.

Example 5

Hydrogenation of $Z_4$ Gardener Viscosity Heat Bodied Linseed Oil

OKO M 2½ (ADM) was used as the starting material. The raw material specifications of OKO M 2½ include a Gardener viscosity of $Z_4$ and an iodine value of 115-130. OKO M 2½ (600 g) was added to a 1 L stainless steel reaction vessel with 6 g of a nickel catalyst (G-53, Sud Chemie, Louisville, Ky.). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig for 16 h. The reaction was then cooled and filtered to remove the nickel catalyst. The IV of the final product was 15.5.

Example 6

Hydrogenation of $Z_9$ Gardener Viscosity Heat Bodied Linseed Oil

OKO M-37 (ADM) was used as the starting material. The raw material specifications of OKO M-37 include a Gardener viscosity of $Z_9$ and an iodine value of 115-130. OKO M-37 (600 g) was added to a 1 L stainless steel reaction vessel with 6 g of a nickel catalyst (G-53, Sud Chemie, Louisville, Ky.). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig for 16 h. The reaction was then cooled and filtered to remove the nickel catalyst.

TABLE 1

Hydrogenated Bodied Oil Test Data

| Sample | Kinematic Viscosity (ASTM D445) (cSt) | Congealing Point (ASTM D938) (° F.) | Cone Penetration (ASTM D937) (dmm) |
|---|---|---|---|
| Example 1 | 33.0 | 84 | too soft |
| Example 4 | 73.0 | 97 | 126 |
| Example 5 | 157 | 95 | 95 |
| Example 6 | N/A* | 93 | 222 |

*Data out of viscosity range.

Example 7

Polyglycerol Esters of Behenic Acid as Crystal Enhancer

Triglycerol (Solvay, Houston, Tex.) and methyl behenate (Proctor & Gamble, Cincinnati, Ohio) and potassium carbonate were added to a 250 mL roundbottom flask equipped with mechanical stirring, a barret style receiver, condenser and nitrogen purge. The reaction was carried out at 165° C. for six hours with removal of methanol. The resulting material was a hard solid waxy material with a melting point about 80° C. This material could be added to hydro-bodied oils, described in previous examples, to modify the crystallinity, physical properties, and melting point of the final material.

Example 8

Hydro Soy/HEAR Oil as Crystal Enhancer for Hydro Bodied-Oils

A blend of fully hydrogenated soy oil and HEAR oil (50 g) was added to hydro-bodied oil (OKO M-2½) in Example 5 (50 g). The components were fully miscible and were blended in the liquid state. The resulting material had a higher melting point and increased hardness in comparison to the hydro-bodied oil in example 4. Hydrogenated soy/HEAR oil could be added to hydro-bodied oils, described in previous examples, to modify the crystallinity, physical properties, and melting point of the final material.

| | |
|---|---|
| Congeal Point (ASTM D938) | 120° F. |
| Drop Melt Point (ASTM D127) | 138° F. |
| Kinematic Viscosity @ 210° F. (ASTM D445) | 37 cst. |
| Needle Penetration @ 77° F. (ASTM D1321) | 25 dmm |

Example 9

Partial Hydrogenation of $Z_4$ Gardener Viscosity Heat Bodied Linseed Oil

OKO M 2½ (ADM) was used as the starting material. The raw material specifications of OKO M 2½ include a Gardener viscosity of $Z_4$ and an iodine value of 115-130. OKO M 2½ (600 g) was added to a 1 L stainless steel reaction vessel with 3 g of a nickel catalyst (G-53, Sud Chemie, Louisville, Ky.). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig. Samples were taken every hour for four hours. The reaction was then cooled and filtered to remove the nickel catalyst. The IV of the final product (4 hour) was 57.8. See Table 2 for IV results.

Example 10

Partial Hydrogenation of X Gardener Viscosity Heat Bodied Linseed Oil

Alinco X (ADM) was used as the starting material. The raw material specifications of Alinco X include a Gardener viscosity of X and an iodine value of 120-130. Alinco X (600 g) was added to a 1 L stainless steel reaction vessel with 3 g of a nickel catalyst (G-53, Sud Chemie, Louisville, Ky.). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig. Samples were taken every hour for four hours. The reaction was then cooled and filtered to remove the nickel catalyst. The IV of the final product (4 hour) was 40.2. See Table 2 for IV results.

TABLE 2

Iodine Values of Bodied Oils at Various Reaction Times

| Sample | 1 h | 2 h | 3 h | 4 h |
|---|---|---|---|---|
| OKO M2 ½ (example 9) | 95.8 | 79.1 | 64.5 | 57.8 |
| Alinco X (example 10) | 69.2 | 47.8 | 40.9 | 40.2 |

Example 11

Hydro Soy Oil as Crystal Enhancer for Hydro Bodied-Oils

A blend of 2 IV fully hydrogenated soy oil (50 g) was added to hydro-bodied oil (OKO M 2½) in example 5 (50 g). The components were fully miscible and were blended in the liquid state. The resulting material had a higher melting point and increased hardness in comparison to the hydro-bodied oil from example 5. Hydrogenated soy oil could be added to hydro-bodied oils, described in previous examples, to modify the crystallinity, physical properties, and melting point of the final material.

| | |
|---|---|
| Congeal Point (ASTM D938) | 124° F. |
| Drop Melt Point (ASTM D127) | 126° F. |
| Kinematic Viscosity @ 210° F. (ASTM D445) | 38.5 cst. |
| Needle Penetration @ 77° F. (ASTM D1321) | 41 dmm |

Example 12

Hydro Soy Oil and Behenic Acid Esters of Triglycerol as Crystal Enhancer for Hydro Bodied-Oils A blend of 2 IV fully hydrogenated soy oil (36 g) and Behenic acid esters of triglycerol (4 g) was added to hydro-bodied oil (OKO M 2½) from example 5 (40 g). The components were fully miscible and were blended in the liquid state. The resulting material had a higher melting point and increased hardness in comparison to the hydro-bodied oil in example 4. Hydrogenated soy oil could be added to hydro-bodied oils, described in previous examples, to modify the crystallinity, physical properties, and melting point of the final material.

| | |
|---|---|
| Congeal Point (ASTM D938) | 130° F. |
| Drop Melt Point (ASTM D127) | 133° F. |
| Kinematic Viscosity @ 210° F. (ASTM D445) | 40.7 cst. |
| Needle Penetration @ 77° F. (ASTM D1321) | 45 dmm |

Example 13

Deodorization of Hydro Bodied Oils

Residual free fatty acids are present in heat bodied oils. These free fatty acids along with residual odor-causing byproducts of hydrogenation can be removed from the hydro bodied oils by deodorization. Deodorization is a process used in the refining of vegetable oils (Y. H. Hui, ed. Bailey's Industrial Oil and Fat Products, 5th edition, Vol. 2, p 537-540, incorporated in its entirety by reference herein). Hydro OKO M 2½ was deodorized at 230° C. for 30 min under a vacuum of about 1 torr. The steam rate for the run was approximately 5% water on the oil.

Example 14

Hydrogenated bodied linseed oil (hydrogenated OKO M 2½, ADM), NuSun sunflower oil (ADM) and a 50/50 mixture of hydro soy/hydro high erucic acid rapeseed (HEAR) oil were blended at the following amounts:
50 g NuSun Oil
25 g Hydrogenated OKO M 2½
25 g 50/50 hydro soy/hydro HEAR
The above materials were mixed in the liquid state above 60° C. When the mixture reached 60° C., it was then placed in a refrigerator at 5° C. to finish cooling. The final material was an opaque material that had a consistency similar to petroleum jelly.

Example 15

Hydrogenated bodied soybean oil (hydrogenated X-bodied soybean oil, ADM), RBD Soybean oil (ADM) and behenic acid esters of triglycerol were blended at the following amounts:
50 g RBD Soybean Oil
49 g Hydrogenated Bodied Soybean Oil (X-Bodied Soybean Oil)
1 g Behenic acid esters of triglycerol
The above materials were mixed in the liquid state above 60° C. When the mixture reached 60° C., it was then placed in a refrigerator at 5° C. to finish cooling. The final material was an off-white, opaque semi-solid that had a consistency similar to petroleum jelly.

Example 16

Hydrogenated bodied linseed oil (hydrogenated OKO M 2½, ADM), NuSun sunflower oil (ADM) and partially hydrogenated soybean oil were blended at the following amounts:
50 g NuSun Oil
25 g Hydrogenated OKO M 2½
25 g Partially hydrogenated soybean oil (42 IV)
The above materials were mixed in the liquid state above 60° C. When the mixture reached 60° C., it was then placed in a refrigerator at 5° C. to finish cooling. The final material was an off-white, opaque, viscous liquid that had a consistency similar to petroleum jelly.

Example 17

Hydrogenated bodied linseed oil (hydrogenated OKO M 2½, ADM), hydrogenated bodied soybean oil (hydrogenated X-bodied soybean oil, ADM), NuSun sunflower oil (ADM), a 50/50 mixture of hydro soy/hydro high erucic acid rapeseed (HEAR) oil and Vitamin E (ADM) were blended at the following amounts:
40 g Hydrogenated OKO M 2½
25 g NuSun Oil
24 g Hydrogenated X-Bodied Soybean Oil
10 g 50/50 hydro soy/hydro HEAR
1 g Vitamin E, 100% d-alpha tocopherol
The above materials were mixed in the liquid state above 60° C. When the mixture reached 60° C., it was then placed in a refrigerator at 5° C. to finish cooling. The final material was an off-white, opaque semi-solid that had a consistency similar to petroleum jelly.

Example 18

Hydrogenation of a Heavy Bodied Blown Linseed Oil

Heavy bodied blown linseed oil (ADM) was used as the starting material. The blown linseed oil (600 g) was added to a 1 L stainless steel reaction vessel with 6 g of a nickel catalyst (G-53, Sud Chemie, Louisville, Ky.). The vessel was purged with hydrogen five times and then pressurized to 200 psig. The reaction was then heated to 230° C. After reaching 230° C., the reaction vessel was pressurized to 300 psig. A continuous feed of hydrogen gas was used holding the pressure of the vessel at 300 psig for 6 h. The reaction was then cooled and filtered to remove the nickel catalyst. The final material was an opaque yellow solid with a hydroxyl value of 77.5, and an IV value of 18.1.

Example 19

Hydrogenation of Blown Soybean Oil

Blown soybean oil (Cargill 680 Blown Soybean Oil, Cargill, Minneapolis, Minn.) was used as the starting material. The blown soybean oil (600 g) was added to a 1 L stainless steel reaction vessel with 6 g of a nickel catalyst (G-53, Sud Chemie, Louisville, Ky.). The vessel was purged with hydrogen five times and then pressurized to 200 psig. The reaction was then heated to 230° C. After reaching 230° C., the reaction vessel was pressurized to 300 psig. A continuous feed of hydrogen gas was used holding the pressure of the vessel at 300 psig for 6 h. The reaction was then cooled and filtered to remove the nickel catalyst. The final material was an opaque yellow solid with a hydroxyl value of 93.

Example 20

Hydrogenation of ML-189
(Dicyclopentadiene-Linseed Oil Copolymer)

ML-189 (600 g), manufactured by ADM, was added to a 1 L stainless steel reaction vessel with 3 g of a nickel catalyst (G-53, Sud Chemie, Louisville, Ky.). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig for 8 h. After hydrogenation, the signal at about 5.2 ppm corresponding to the olefin component was not present in the $^1$H NMR spectrum. The hydrogenated material was a hard wax-like solid at room temperature with a melting point of 44.7° C. (Mettler drop point).

Example 21

Hydrogenation of Toplin X-Z (Linseed Oil Copolymer)

Toplin X-Z (600 g), manufactured by ADM, was added to a 1 L stainless steel reaction vessel with 3 g of a nickel catalyst (G-53, Sud Chemie, Louisville, Ky.). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig for 8 h. The hydrogenated material was a hard wax-like solid at room temperature with a melting point of 49.9° C. (Mettler drop point). After hydrogenation, the signal at 5.2 ppm corresponding to the olefin component was not present in the $^1$H NMR spectrum.

Example 22

Partial Hydrogenation of Toplin X-Z (Linseed Oil Copolymer)

Toplin X-Z (600 g), manufactured by ADM, was added to a 1 L stainless steel reaction vessel with 3 g of a nickel catalyst (G-53, Sud Chemie, Louisville, Ky.). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig for 2 h. The hydrogenated material was a soft semi-solid material. After hydrogenation, $^1$H NMR analysis indicated that the signal at 5.2 ppm corresponding to the olefin component was reduced by 50%.

Example 23

Blend of Hydrogenated Heat Bodied Oil and Hydrogenated HEAR Oil

Hydrogenated bodied linseed oil (OKO M 2½, ADM), 100 g, was melted and mixed with 100 g of melted hydrogenated HEAR (high erucic acid rapeseed) oil. The mixture was then allowed to cool to room temperature. At room temperature, the mixture was a white, hard, waxy solid. Peak melting point was about 58° C.

Example 24

Blend of Hydrogenated Heat Bodied Oil and Hydrogenated Castor Oil

Hydrogenated bodied linseed oil (OKO M 2½, ADM), 100 g, was melted and mixed with 100 g of melted hydrogenated castor oil (Sud Chemie, Louisville, Ky.). The mixture was then allowed to cool to room temperature. At room temperature, the mixture was a white, hard, waxy solid. Mettler drop point was 85.8° C. Peak melting point was about 80° C.

Example 25

Interesterification of Hydro-Heat Bodied Oils with Triacylglycerols

Heat bodied linseed oil (OKO M 2½, ADM) having a Gardener viscosity of Z4 and an IV of 115-130 was hydrogenated as follows. The heat bodied linseed oil (OKO M 2½, 600 g) was added to a 1 L stainless steel reaction vessel with 6 g of a nickel catalyst (G-53, Sud Chemie, Louisville, Ky.). The vessel was purged with hydrogen five times and then pressurized to 200 psig of hydrogen. The reaction was heated to 230° C. After reaching 230° C., the reaction vessel was pressurized to 300 psig. A continuous feed of hydrogen gas was used, holding the pressure of the vessel at 300 psig for 16 h. The reaction was then cooled and filtered to remove the nickel catalyst. The IV of the product was 15.5.

The hydrogenated heat bodied linseed oil was chemically interesterified with an equal weight of fully hydrogenated soybean oil. Hydrogenated OKO 2½ (50 grams) was combined with fully hydrogenated soybean oil (Dritex S) in a 500 ml round bottom flask. Vacuum (20 psi) was applied and the mixture was heated to 90° C. for one hour to remove any traces of water. Interesterification catalyst (sodium methoxide; 0.3 grams; 5.56 millimoles) was added and the mixture was heated to 140° C. for 2 hours to carry out interesterification. The interesterified product was allowed to cool below 100° C. and was mixed with a solution of citric acid containing 5.56 millimoles of citric acid. The mixture of wash solution and interesterified product was transferred to a hot separatory funnel. The wash layer was removed, and the interesterified product was washed with four water washes, after which the pH value of the used wash solution was neutral. The resulting material retained a desirable high melting point, with a transition temperature of 53.1° C., but was significantly less brittle than fully hydrogenated soybean oil. FIG. 1 illustrates the differential scanning calorimetry (DSC) scans of the starting materials (Dritex, the fully hydrogenated soybean oil and the heat bodied linseed oil) and the interesterified product (wax-OKO).

Example 26

Hot Melt Adhesive Formulations

For the purpose of demonstrating the utility of the polymerized oil in hot melt adhesive applications, evaluations are conducted to determine the performance of hydrogenated and partially hydrogenated polymerized vegetable oils versus a control petroleum derived microcrystalline wax in standard hot melt ethylene vinyl acetate ("EVA") formulations. One series of tests includes high vinyl acetate (28%) content, whereas the other series includes low vinyl acetate (18%) content. The ingredients are added on a weight basis. The compositions of the formulations are in Table 3. The hot melt adhesive compositions are made according to the disclosure of U.S. Application Publication No. US20030229168A1, the disclosure of which is incorporated in its entirety by reference herein.

TABLE 3

Composition of Hot-Melt Adhesive Formulations
(all units in grams)

|  | Control | Material 1 | Material 2 |
|---|---|---|---|
| High VA Content Formulations (28% VA in resin) | | | |
| EVA (28% VA) | 200 | 200 | 200 |
| Tackifier (FORAL 85) | 200 | 200 | 200 |
| Wax-control 200 | 200 | | |
| Material 1 | | 200 | |
| Material 2 | | | 200 |
| Thermal stabilizer (IRGANOX 1010) | 6 | 6 | 6 |
| Low VA Content Formulations (18% VA in resin) | | | |
| EVA (18% VA) | 200 | 200 | 200 |
| Tackifier (FORAL 85) | 200 | 200 | 200 |
| Wax-control | 200 | | |
| Material 1 | | 200 | |
| Material 2 | | | 200 |
| Thermal stabilizer (IRGANOX 1010) | 6 | 6 | 6 |

The formulations include ULTRATHENE® 612-04 (EVA resin with 18% vinyl acetate content, commercially available from Equistar Chemicals, LP, Houston Tex.), ULTRATHENE® 646-04 (EVA resin with 28% vinyl acetate content, commercially available from Equistar Chemicals, LP, Houston Tex.), FORAL® 85 resin ester tackifier (commercially available from Hercules, Wilmington, Delaware), IRGANOX® 1010 thermal stabilizer (commercially available from Ciba-Geigy, Tarrytown, N.Y.). The control formulation includes microcrystalline wax (commercially available from Frank B. Ross Co., Rahway, N.J.), whereas Material 1 comprises hydrogenated polymerized soybean oil and Material 2 comprises partially hydrogenated polymerized soybean oil. The compositions are blended in a quart can heated by a glass heating mantle, as follows. Tackifier and stabilizer are added into the can and the mixture allowed to heat for 10 minutes to ensure uniformly melted material. Mixing is started at a moderate rate of speed while the EVA is slowly added over 25 minutes. While mixing is continued, the wax/polymerized oil is slowly added into the adhesive over a 15 minute period. The resulting adhesive mixture is allowed to mix for an additional 15 minutes to assure uniformity. The final adhesive temperature ranges from 350° F. to 360° F.

Example 27

Moisture Resistant Cardboard Coating

In this Example, corrugated cardboard strips were coated and tested for moisture resistance and flexibility.

Hydrogenated heat bodied linseed oil (OKO M 2½, 50 g, ADM) having an IV of 31.6 was mixed with propylene glycol monostearate blend additive (50 g, 90% monoester, Aldo-90 Lonza, Allendale, N.J.). The mixture was melted and mixed together. Corrugated cardboard squares were cut from a box and dipped into the melted mixture for 15-20 seconds. The melted material quickly penetrated the cardboard during the dipping procedure. After dipping, the excess material was removed. The treated cardboard strips were resistant to water penetration and did not crack (coating crack) when bent at a 45-90° angle (no flaking off of the coating was observed).

Cardboard coatings were prepared by melting basestock petroleum waxes and bioderived basestocks and optionally supplementing with a blend additive (added at 2 wt % of the entire formulation). In a comparison test, hydrogenated heat bodied linseed oil was mixed with petroleum based waxes (3 wt % hydrogenated OKO 2½ with 97 wt % petroleum wax) and tested for wax pick-up (penetration) and water pick-up (absorption). The petroleum waxes used in the blends were Citgo PM (commercially available from Citgo Wax Laboratory, Sulphur, La.); Robwax 2309 (commercially available from C.J. Robison Company, Inc., Bridgeport, Pa.); Parvan 1270 (commercially available from ExxonMobile, Baton Rouge, La.); and Calumet SC5717 (commercially available from Calumet Lubricants Co., Shreveport, La.). Dry 2 inch square corrugated cardboard squares were weighed to four decimal places. Coating formula waxes were heated to 96-99° C. and each square was coated by dipping the cardboard into the coating for 15-20 seconds or pouring the coating over the cardboard. The coated samples were allowed to cool overnight and weighed again to determine the wax pick-up (tests were done in triplicate). Coated samples were submerged in room temperature water and held under with a weighted grate for four hours, then removed, patted dry, and weighed to determine the mass of water accumulated by each square. Each square was examined visually for adhesive failure of the coating, as detected by peeling or pulling away of the coating from the cardboard. Hydrogenated heat bodied linseed oil (OKO M 2½) having an IV of 31.6 was also used as a box coating without any basestock petroleum wax. The wax pick-up was 2.1734 grams, and water pick-up was very low (0.0819 grams). The wax pick-up and water pick-up results are presented in Table 4.

TABLE 4

Cardboard Coating Comparison: Petroleum Wax (Control) and Petroleum Wax with 3% Hydrogenated OKO 2½ Additive.

|  | Control wax pick-up (g) | Control water pick-up (g) | Wax pick-up (g) with additive | Water pick-up (g) with additive |
|---|---|---|---|---|
| Citgo PM | 1.0731 | 0.385 | 1.1098 | 0.377 |
| Robwax2309 | 1.0773 | 0.359 | 1.0970 | 0.389 |
| Parvan 1270 | 1.0895 | 0.415 | 0.8151 | 0.692 |
| Calumet SC5717 | 0.8183 | 0.362 | 0.8196 | 0.653 |
| Additive only | | | 2.1734 | 0.0819 |

Roughly comparable levels of wax pick-up were obtained with Citgo PM, Robwax 2309, and Calumet SC5717 with and without 3% hydrogenated OKO 2½ added to the petroleum wax. Water pick-up was comparable for Citgo PM and Robwax 2309 with and without hydrogenated OKO 2½ additive, but increased when the additive was used with Calumet SC5717. The wax pickup obtained with Parvan 1270 decreased when 3% hydrogenated OKO 2½ was added to the wax. However, water pick-up increased.

Example 28

Polyester Polymerization Reaction

This Example sets forth a representative polyester polymerization reaction using hydrogenated and partially hydrogenated polymerized vegetable oils. Partially hydrogenated polymerized vegetable oil having at least two free hydroxyl groups is combined with a molar quantity of diisocyanate half the molarity of free hydroxyl groups in partially hydrogenated polymerized (blown) vegetable oil to make polyurethane as described by Frisch (Fundamental Chemistry and Catalysis of Polyurethanes, Frisch, K. C., in, *Polyurethane*

*Technology*, Paul Bruins, editor, Interscience Publishers, N.Y., 1969, hereby incorporated by reference in its entirety). A sample of partially hydrogenated polymerized soybean oil having a hydroxyl value of 50 is combined with a diisocyanate at 100° C. to make branched polymers suitable for use in fibers, hard and soft elastomers, coatings and adhesives, flexible and rigid foams, and thermoplastics and thermosetting plastics.

Example 29

Candle

In this Example, blends of the hydrogenated polymerized oil with propylene glycol monoesters were used in place of petroleum-based waxes to make waxes suitable for use in candle compositions. A gel candle (container candle) and a harder wax candle were produced.

Hydrogenated head-bodied linseed oil (OKO M 2½, 50 g, ADM) was melted and blended with propylene glycol monostearate (50 g, 90% monoester, Aldo-90 Lonza, Allendale, N.J.) to form a candle wax. The resulting composition was poured into a container having a wick for use as a container candle. The resulting candle had a smooth appearance without any noticeable crystalline structure. The candle was shelf stable, showing no cracking or discoloration after storage at room temperature for 1 year.

In another example, candle wax was prepared by melting kettle heat-bodied linseed oil (Alinco Q, ADM) which was poured into a candle mold having a wick. The material was allowed to cool and the candle removed from the mold. The candle was shelf stable, showing no cracking or discoloration after storage at room temperature for 1 year.

In another example, kettle heat-bodied linseed oil (Alinco X, ADM) was melted and blended with melted partially hydrogenated soybean oil having an IV of 21 to form a candle wax. The candle wax was poured into a candle mold having a wick. The material was allowed to cool and the candle removed from the mold.

Example 30

Animal Feed Blocks and Particulate Feeds

In this Example, hydrogenated and partially hydrogenated polymerized vegetable oil are used to replace petroleum-based ingredients in animal feed blocks. In these commercial protein and mineral block applications, individual ingredients are blended in a ribbon mixer, with the blended mixture pressed in a hydraulic press to produce a feed block that weighs between 20 and 40 pounds. The hydrogenated polymerized vegetable oils allow for individual ingredients to adhere to one another and the finished product to retain its physical integrity. A sample feed block formulation for a protein containing block is presented in Tables 5 and a sample mineral block formulation is presented in Table 6.

TABLE 5

| Protein Block | |
| --- | --- |
| Protein block ingredients | Percentage |
| Oilseed meal | 69 |
| Salt | 13 |
| Monocalcium phosphate, 21% | 5 |
| Calcium carbonate, 38% | 4 |
| Non-protein nitrogen | 3 |

TABLE 5-continued

| Protein Block | |
| --- | --- |
| Protein block ingredients | Percentage |
| Polymerized soy oil, hydrogenated | 2 |
| Vitamin-trace mineral premix | 4 |
| Total | 100 |

TABLE 6

| Mineral Block | |
| --- | --- |
| Mineral block ingredients | Percentage |
| Monocalcium phosphate, 21% | 30 |
| Calcium carbonate, 38% | 26 |
| Salt | 15 |
| Defluorinated phosphate, 18% | 10 |
| Molasses, cane | 4 |
| Magnesium oxide | 4 |
| Oilseed meal | 5 |
| Polymerized soy oil, hydrogenated | 1 |
| Vitamin-trace mineral premix | 5 |
| Total | 100 |

In another Example of a specific agglomerated, loose mineral applications, polymerized soy oil is used to agglomerate (bind) micronutrients (e.g., zinc, manganese, copper, cobalt) to achieve a more uniform particle size of the finished mineral product when combined with macro-ingredients (e.g., monocalcium phosphate, limestone, defluorinated phosphate). Typically, the micronutrients and oil source are pre-blended to achieve the initial agglomeration, with the agglomerate blended with the macro-ingredients in a ribbon mixer to produce the final product. A sample formula is presented in Table 7.

TABLE 7

| Particulate Animal Feed | |
| --- | --- |
| Ingredient | Percentage |
| Monocalcium phosphate, 21% | 44 |
| Limestone, coarse | 30 |
| Salt | 10 |
| Oilseed meal | 4 |
| Defluorinated phosphate, coarse | 4 |
| Polymerized soy oil, hydrogenated | 3 |
| Molasses, cane | 2 |
| Vitamin-trace mineral premix | 3 |
| Total | 100 |

Feeding the developed products to ruminant animals and other grazing animals results in feed consumption within the targeted intake ranges.

Example 30

Personal Care Products

In this Example, personal care product formulations will be developed where the hydrogenated polymerized vegetable oils will replace petroleum-derived petrolatums. A hand cream is prepared where petrolatum is replaced with a hydrogenated polymerized vegetable oil.

Deodorization, substantially as set forth in Example 13, removes free fatty acids, which reduces irritation, itching or skin sensitization due to the residual free fatty acid content. Deodorized polymerized oil is substituted for petrolatum to yield a hand cream having the composition as set forth in Table 8. The ingredients are mixed together and resulting cream may be used as a hand cream or moisturizing cream.

TABLE 8

Hand Cream Formulation 400 mL jar of Vitamin "A" cream (any brand)
400 mL jar of Vitamin "E" cream (any brand)
155 gram tube polysporin
2 tbsp deodorized hydrogenated soybean oil
4 tbsp baby oil

Having now fully described this invention, it will be understood to those of ordinary skill in the art that the same can be performed within a wide and equivalent range of conditions, formulations, and other parameters without affecting the scope of the invention or any embodiment thereof. All patents, patent applications, and publications cited herein are fully incorporated by reference herein in their entirety.

We claim:

1. A material comprising:
a hydrogenated polymerized oil, wherein the material is one of a binder and a coating.

2. The material of claim 1, wherein the material is a binder selected from the group consisting of a hot melt adhesive, a binder for a wood composite material, a binder for a feed block, a binder for an agricultural product, an asphalt binder, and a binder for a personal care product.

3. The material of claim 2, wherein the binder is a hot melt adhesive comprising 40% to 50% by weight of the hydrogenated polymerized oil, and further comprises 40% to 50% by weight of a hydrocarbon resin and 10% to 20% by weight of a hydrogenated vegetable oil.

4. The material of claim 2, wherein the binder is a binder for a wood composite material wherein the hydrogenated polymerized oil comprises a partially hydrogenated polymerized oil and forms a crosslinked polymer network upon oxidative curing.

5. The material of claim 4, wherein the binder further forms an at least partially moisture resistant layer on at least one surface of the wood composite material.

6. The material of claim 2, wherein the binder is a binder for a feed block, wherein the feed block further comprises at least one additional component selected from the group consisting of proteins, non-protein nitrogen sources, vitamins, minerals, palatability increasing agents, and agro-industrial by-products selected from the group consisting of tomato pulp, olive cake, date pulp, rice bran, vegetable meals, oilseed meals, animal proteins, grain co-products, molasses, poultry waste, fermentation co-products, plant botanical extracts, and combinations thereof, and wherein the feed block is at least partially moisture resistant.

7. The material of claim 2, wherein the binder is a binder for an agricultural product selected from the group consisting of a pesticide, an herbicide, a fertilizer, and a rodenticide.

8. The material of claim 2, wherein the binder is an asphalt binder, wherein the asphalt binder comprises partially hydrogenated polymerized oil and the asphalt binder undergoes an oxidative cure, and wherein the material increases at least one of toughness, low temperature ductility, high temperature viscosity, fatigue cracking resistance, impact resistance, and aggregate adhesion.

9. The material of claim 2, wherein, the binder is a binder for a personal care product, wherein the hydrogenated polymerized oil replaces a petrolatum product.

10. A material of claim 1, wherein the material is a coating selected from the group consisting of a coating for an agricultural product, a packaging coating, an edible food coating, and a concrete mold release coating.

11. The material of claim 10, wherein the coating is a packaging coating further comprising an alkyl ester.

12. The material of claim 10, wherein the material is a flexible packaging coating.

13. The material of claim 10, wherein the coating is an edible food coating selected from the group consisting of a fruit coating, a vegetable coating, and an animal feed coating.

14. The material of claim 13, wherein the coating is an animal feed coating on an animal feed comprising an ingredient selected from the group consisting of animal proteins, animal fats, plant proteins, plant oils, non-protein nitrogen sources, and combinations of any thereof, wherein an amount of the animal feed passing at least partially intact through a rumen of a ruminant is increased compared to an animal feed that is not coated with the animal feed coating.

15. The material of claim 10, wherein the coating is a concrete mold release coating, the coating further comprising at least one component selected from the group consisting of a vegetable oil, an alcohol, a fusel oil mixture, a lactate ester, a fatty acid methyl ester, and a propylene glycol monoester.

16. A polymer composition comprising a partially hydrogenated polymerized oil, wherein at least one remaining carbon-carbon double bond has been converted to at least one epoxide.

17. The polymer composition of claim 16, wherein at least one of the at least one epoxide has been reacted with at least one nucleophile to form a ring opened product.

18. The polymer composition of claim 17, wherein the nucleophile is one of water and hydroxide ion and the at least one of the at least one epoxide has been converted to at least one vicinal diol.

19. A material comprising:
a hydrogenated polymerized oil; and
at least one organic material, wherein the organic material is selected from the group consisting of a vegetable based material and a petroleum derived material.

20. The material of claim 19, wherein the at least one organic material is a petrochemical derived material selected from the group consisting of a paraffin, a microcrystalline wax, a mineral oil, and combinations of any thereof.

21. The material of claim 20, wherein the material is a coating.

22. A grease comprising:
a hydrogenated polymerized oil; and
at least one metal salt of a free fatty acid.

23. An emulsion comprising:
a hydrogenated polymerized oil; and
at least one emulsifier selected from the group consisting of xanthum gum, propylene glycol alginate, locust bean gum, maltodextrin, a fatty alcolhol ethoxylate, a fatty acid ethoxylate, a sorbitan derivative, a polyglycerol ester, lecithin, and combinations of any thereof.

* * * * *